(12) United States Patent
Kuno et al.

(10) Patent No.: US 8,410,379 B2
(45) Date of Patent: Apr. 2, 2013

(54) ELECTRIC OPERATING DEVICE OF VEHICLE SEAT

(75) Inventors: Satoru Kuno, Aichi-ken (JP); Toshihide Azuma, Aichi-ken (JP); Hisato Shimomura, Miyagi-ken (JP); Jun Yashiro, Ishinomaki (JP); Yukio Kanzaki, Miyagi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 727 days.

(21) Appl. No.: 12/515,066

(22) PCT Filed: Oct. 12, 2007

(86) PCT No.: PCT/JP2007/069944
§ 371 (c)(1),
(2), (4) Date: Jul. 13, 2009

(87) PCT Pub. No.: WO2008/065816
PCT Pub. Date: Jun. 5, 2008

(65) Prior Publication Data
US 2009/0294259 A1    Dec. 3, 2009

(30) Foreign Application Priority Data
Nov. 29, 2006  (JP) ................. 2006-321584

(51) Int. Cl.
*H01H 9/00*  (2006.01)
(52) U.S. Cl. ............... 200/4; 200/6 A; 200/18
(58) Field of Classification Search ............ 200/4, 5 R, 200/6 A, 17 R, 18
See application file for complete search history.

(56) References Cited

U.S. PATENT DOCUMENTS

| | | | |
|---|---|---|---|
| 3,483,337 A * | 12/1969 | Johnstone et al. ............ 200/6 A |
| 5,126,640 A | 6/1992 | Leroy | |
| 6,720,504 B2 * | 4/2004 | Nishimoto et al. ............. 200/4 |
| 6,894,234 B1 * | 5/2005 | Sottong ....................... 200/5 R |

(Continued)

FOREIGN PATENT DOCUMENTS

| | | |
|---|---|---|
| DE | 10353403 | 6/2005 |
| EP | 1340647 | 9/2003 |

(Continued)

OTHER PUBLICATIONS

English language Abstract of JP 2006-88718, Apr. 6, 2006.

(Continued)

*Primary Examiner* — Renee Luebke
*Assistant Examiner* — Lheiren Mae Caroc
(74) *Attorney, Agent, or Firm* — Greenblum & Bernstein, P.L.C.

(57) ABSTRACT

An electric operating device includes an operation member for operating to activate a plurality of electric functions provided at a vehicle seat. An operating structure for switching a pivoting position of the operation member is configured as a switching structure for selecting the electric function that is an operational object. Further, an operating structure for switching a slide position in a diametrical direction of the operation member is configured as an operation control structure by which the electric function selected as the operational object is operated to activate. Further, a pushing operation structure of the operation portion is configured as a switching structure for switching a category of an electric function group. The pushing operating structure of the operation member is provided with a return mechanism for returning the operation member operated to be pushed to an initial position taken before the pushing operation by urging the operation member.

6 Claims, 16 Drawing Sheets

U.S. PATENT DOCUMENTS

| | | | | |
|---|---|---|---|---|
| 6,953,900 B2 * | 10/2005 | Sottong | .......................... | 200/5 R |
| 7,282,656 B2 * | 10/2007 | Niiyama | ........................ | 200/5 R |
| 2006/0243566 A1 * | 11/2006 | Sakai | ............................ | 200/1 R |

FOREIGN PATENT DOCUMENTS

| | | |
|---|---|---|
| JP | 63-153007 | 6/1988 |
| JP | 63-172350 | 11/1988 |
| JP | 63-318910 | 12/1988 |
| JP | 2-256524 | 10/1990 |
| JP | 6-48228 | 2/1994 |
| JP | 6-47031 | 6/1994 |
| JP | 9-109746 | 4/1997 |
| JP | 2000-113777 | 4/2000 |
| JP | 2001-202851 | 7/2001 |
| JP | 3340883 | 8/2002 |
| JP | 2004-288393 | 10/2004 |
| JP | 2006-4091 | 1/2006 |
| JP | 2006-88718 | 4/2006 |

OTHER PUBLICATIONS

English language Abstract of JP 2006-4091, Jan. 5, 2006.
English language Abstract of JP 8-268125, Oct. 15, 1996.
English language Abstract of JP 6-48228, Feb. 22, 1994.
English language Abstract of JP 9-109746, Apr. 28, 1997.
English language Abstract of JP 2001-202851, Jul. 27, 2001.
English language Abstract of JP 2004-288393, Oct. 14, 2004.

* cited by examiner

ELECTRIC OPERATING DEVICE OF VEHICLE SEAT

TECHNICAL FIELD

The present invention relates to an electric operating device of a vehicle seat. More specifically, the invention relates to an electric operating device of a vehicle seat capable of individually operating to activate a plurality of electric functions provided at a vehicle seat.

BACKGROUND ART

Conventionally, there has been a vehicle seat provided with an electric function capable of electrically adjusting an angle of inclination of a seat back and forward and rearward slide positions of a seat cushion. The electric functions are operated for activation, for example, by a switch arranged at an outer side portion of the seat cushion.

Here, JP-A-2004-288393 discloses a structure of arranging the above-described switch. According to the disclosure, in order to enable to individually adjust attitude positions of the seat back and the seat cushion, a changeover switch for switching an adjustment object and an adjusting switch for adjusting to move the selected object in forward and rearward directions and in upward and downward directions are separately disposed.

Thus, there is a need in the art for an improved electric operating device of a vehicle seat.

SUMMARY OF THE INVENTION

One aspect of the present invention can include an electric operating device of a vehicle seat that includes an operation member for operating to activate a plurality of electric functions provided at the vehicle seat. The operation member is disposed at a position outside of the vehicle seat capable of being operated by a seated person seated on the vehicle seat. The operation member is constructed to be capable of operating to pivot about an axis and operating to move to slide in a diametrical direction. Further, an operation structure for pivoting about the axis for switching a pivoting position of the operation member is configured as an electric function mode switching structure for selecting the electric function as an operational object from the plurality of electric functions. Further, a slide moving operating structure for switching a slide position in the diametrical direction of the operation member is configured as an operation control structure for operating to activate the electric function selected as the operational object. Further, the operation member is configured to also allow a pushing operation in a direction of a center axis in pivoting about the axis. Further, a pushing operation structure of the operation member is configured as an electric function category switching structure for switching between each other a first electric function group including the electric function related to a position adjusting function capable of moving a disposed position of a component of the vehicle seat, and a second electric function group other than the first electric function group. The pushing operation structure of the operation member is provided with a return mechanism capable of returning the operation member operated to be pushed to an initial position taken before the pushing operation by urging the operation member.

Here, as 'a plurality of electric functions provided at a vehicle seat', the followings may be included. For example, electric functions, such as a position adjusting function enabling to electrically adjust a back leaning angle of a seat back or front and rear slide positions of a seat cushion, and a comfort improving function, such as a lumbar support, a vibrator for massage or the like, for improving comfort when seated are included. Further, with regard to the electric function, 'operating to activate' refers to an operation for switching ON/OFF of the electric function, adjusting strongness or weakness of an output, switching of an operating direction or the like.

By switching the pivoting position by operating to pivot about the axis of the operation member, the electric function that is the operational object is selected from a plurality of electric functions provided at the vehicle seat. Further, by switching the slide position by operating to slide to move the operation member in a diametrical direction, the electric function selected as the operational object is operated for activation. That is, by operating a single operation member, both of selection of the electric function and the activating operation thereof can be carried out. Further, in the case that the number of the electric functions is increased, it can be dealt by increasing the set number of pivoting positions for selecting the electric function by operating to pivot the operation member about the axis. Further, by operating to push the operation member, a state of selecting the electric function group is switched between the first electric function group and the second electric function group each other. Therefore, the set number of the pivoting positions of the operation member for the selecting the electric function can be increased without increasing an installing space of the electric operating device. Further, the operation member operated to be pushed is returned to an initial position taken before the pushing operation by a return mechanism. Therefore, the push operation of the operation member can be carried out always by the same operation feeling.

Further, the electric function category switching structure may be set to be the state of selecting the first electric function group in the initial state taken before the pushing operation of the operation member. In a state of selecting the second electric function group by the pushing operation of the operation member, by leaving the operation of the operation member for a given period of time, the state of selecting the electric function group is returned to the state of selecting the first electric function group.

By operating to push the operation member, the state of selecting the electric function group is switched from the first electric function group to the second electric function group. Further, when the operation of the operation member is left for a given period of time in this state, the state of selecting the electric function group is returned again to the first electric function group. Therefore, the state of selection can easily be determined by regarding that in the state of leaving the operation of the operation member for the given period of time, the state of selecting the electric function group is always the state of selecting the first electric function group that is the initial state. Further, because it is set that the first electric function group including the position adjusting function is selected as the initial state, the activating operation can be carried out by easily selecting the function that is high in frequency of use like this.

Further, the operation member may be disposed at the outer side portion of the vehicle seat. Further, the pushing operation of the operation member is carried out toward an inner side of the vehicle seat. According to this constitution, the operation member is disposed at a narrow gap position between the vehicle seat and a side wall member, such as a door trim or the like, disposed on an outer side (window side) thereof. However, even within the narrow gap, the pushing operation of the operation member can easily be carried out by the pushing operation toward inside of the gap.

Further, the function related to the comfort improving function for improving comfort of the seated person may be included in the plurality of electric functions. A direction of the slide moving operation in the diametrical direction of the operation member may be set to the forward, rearward, upward or downward direction of the vehicle seat. The operation for activating the electric function related to the comfort improving function by the operation member is switched to ON/OFF by an operation of sliding to move the operation member in upward and downward directions of the vehicle seat. Further, according to the activating operation of the electric function related to the comfort improving function by the operation member, strongness or weakness of the output or an activating portion is switched by the operation of sliding to move the operation member in the forward or rearward direction of the vehicle seat. Here, as 'comfort improving function', the electric functions, such as a lumbar support, a vibrator for massage, a ventilator and a seat heater or the like, for improving comfort when seated are included.

In the state of selecting the electric function related to the comfort improving function, by operating to slide to move the operation member in upward and downward direction of the vehicle seat, the electric function may be switched to ON/OFF. Further, by operating to slide to move the operation member forwardly or rearwardly of the vehicle seat, the strength or weakness of the output of the electric function or the activating portion may be switched. In this way, the operation for activating the electric function related to the comfort improving function can be carried out with an operation feeling that is easy to be imaged and the operation can easily be carried out.

Further, the electric operating device of the vehicle seat may include a slide direction detecting device of detecting a diameter direction in which the operation member is operated to slide to move, a pivoting position detecting device of detecting a pivoting position by which the operation member is operated to axially pivot, a pushing operation detecting device of detecting a movement of operating to push the operation member, and an output device of outputting a state of operating to manipulate the electric function by the operation member as an image or a voice at a vehicle-mounted monitor or a voice speaker arranged at inside of a vehicle compartment based on detection information detected by the respective detecting devices.

The seated person can recognize a state of operating to manipulate the electric function by the operation member by visual sensation or auditory sensation by the vehicle-mounted monitor or the voice speaker. Therefore, selection of the respective electric functions and determination of manipulating operation can simply be carried out.

Further, the state of operating to manipulate the electric function by the operation member may be outputted as an interrupted image or an interrupted voice at the vehicle-mounted monitor or the voice speaker in operating the operation member. Therefore, the state of operating to manipulate the electric function by the operation member is interruptingly outputted in operating the operation member, and therefore, normally, the vehicle-mounted monitor or the voice speaker can be used by outputting a main image of map information, a television image or the like or main voice of music or the like. Further, when the operation member is operated, by outputting the operating state by the interrupted image or the interrupted voice, the operation member can be informed to pay attention thereto.

DETAILED DESCRIPTION OF THE INVENTION

An embodiment of the invention will be explained as follows in reference to the drawings.

Embodiment 1

Figure 1:
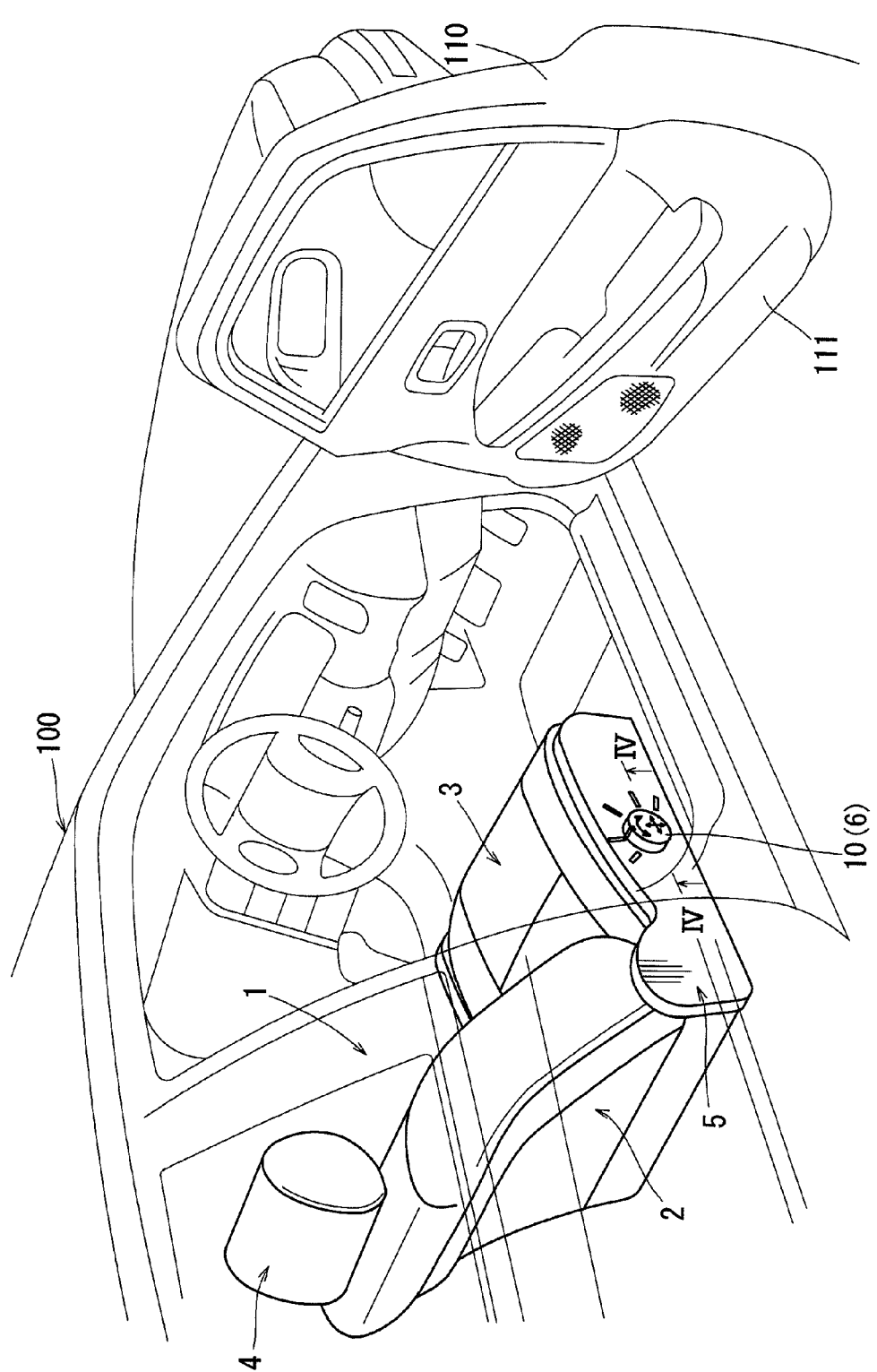
FIG. 1 is a perspective view showing a schematic constitution of an electric operating device of a vehicle seat of Embodiment 1.

First, an electric operating device of a vehicle seat of Embodiment 1 will be explained in reference to FIG. 1 through FIG. 14. As shown in FIG. 1, the vehicle seat 1 is arranged as a driver's seat of a vehicle, including a seat back 2 constituting a back rest, a seat cushion 3 constituting a seating portion, and a head rest 4 constituting a head support. Further, shields 5 are mounted to both side portions in a width direction of the vehicle seat 1 for covering connecting portions between the seat back 2 and the seat cushion 3 from the outer side. Further, an operation member 10 of an electric operating device 6 is disposed on the shield 5 arranged on a vehicle window side (right side in a paper face: outer side).

The operation member 10 is formed to have a shape of a cylinder projecting to an outer side (window side) of the shield 5, and is disposed at a position in a vicinity of a central portion with respect to forward and rearward directions of the seat cushion 3. Therefore, the hands of a seated person seated on the vehicle seat 1 can easily reach the operation member 10, while the operation member 10 is arranged at a narrow gap between the vehicle seat 1 and a door trim 111 (side wall member) of a door 110 on a window side of a vehicle body 100. However, the operation member 10 is made to be able to be operated easily by putting the hand into the gap even if it is arranged within such a narrow gap.

Figure 2:
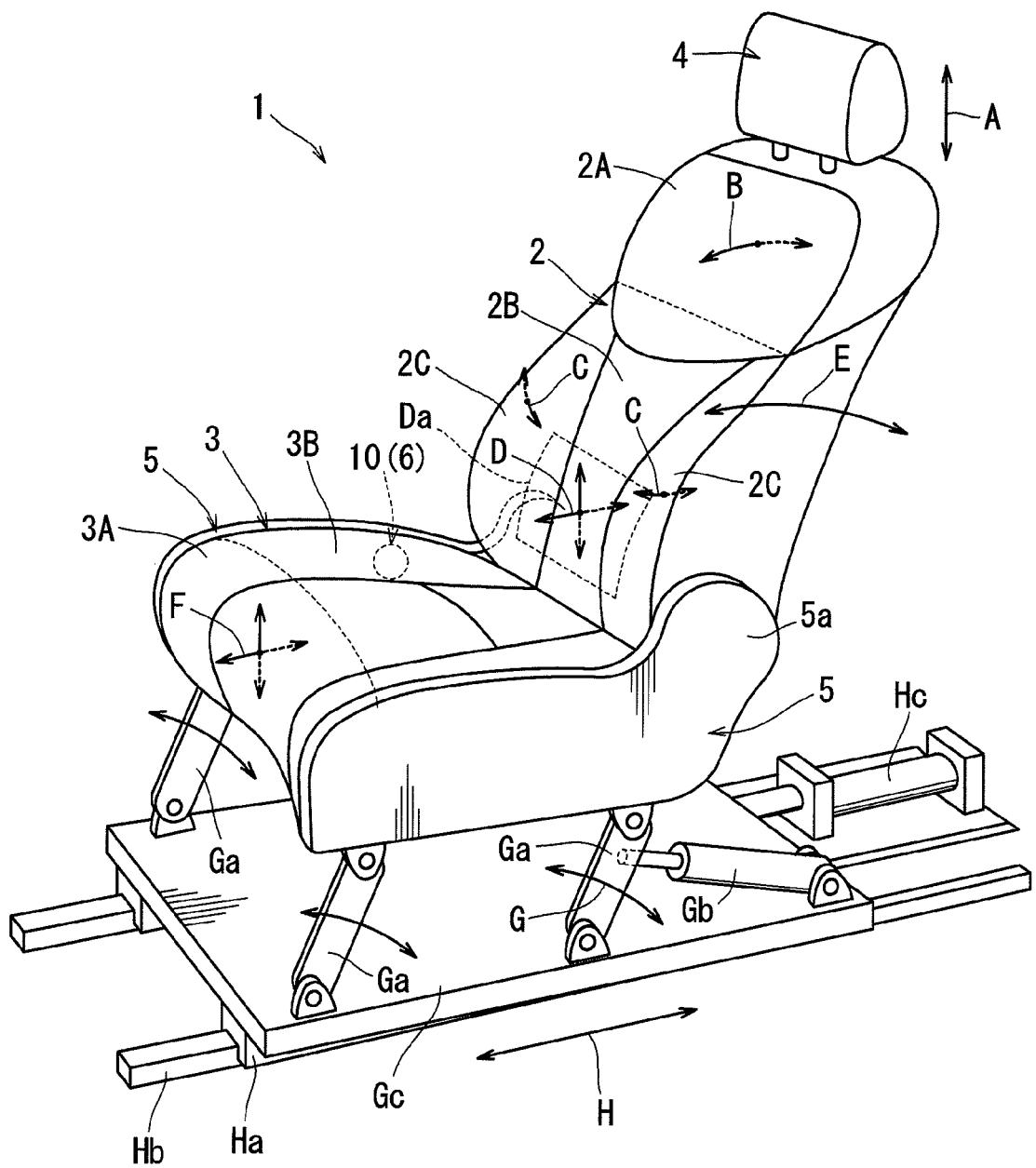
FIG. 2 is a perspective view showing a schematic constitution of an electric function group relating to a position adjusting function.
Figure 3:
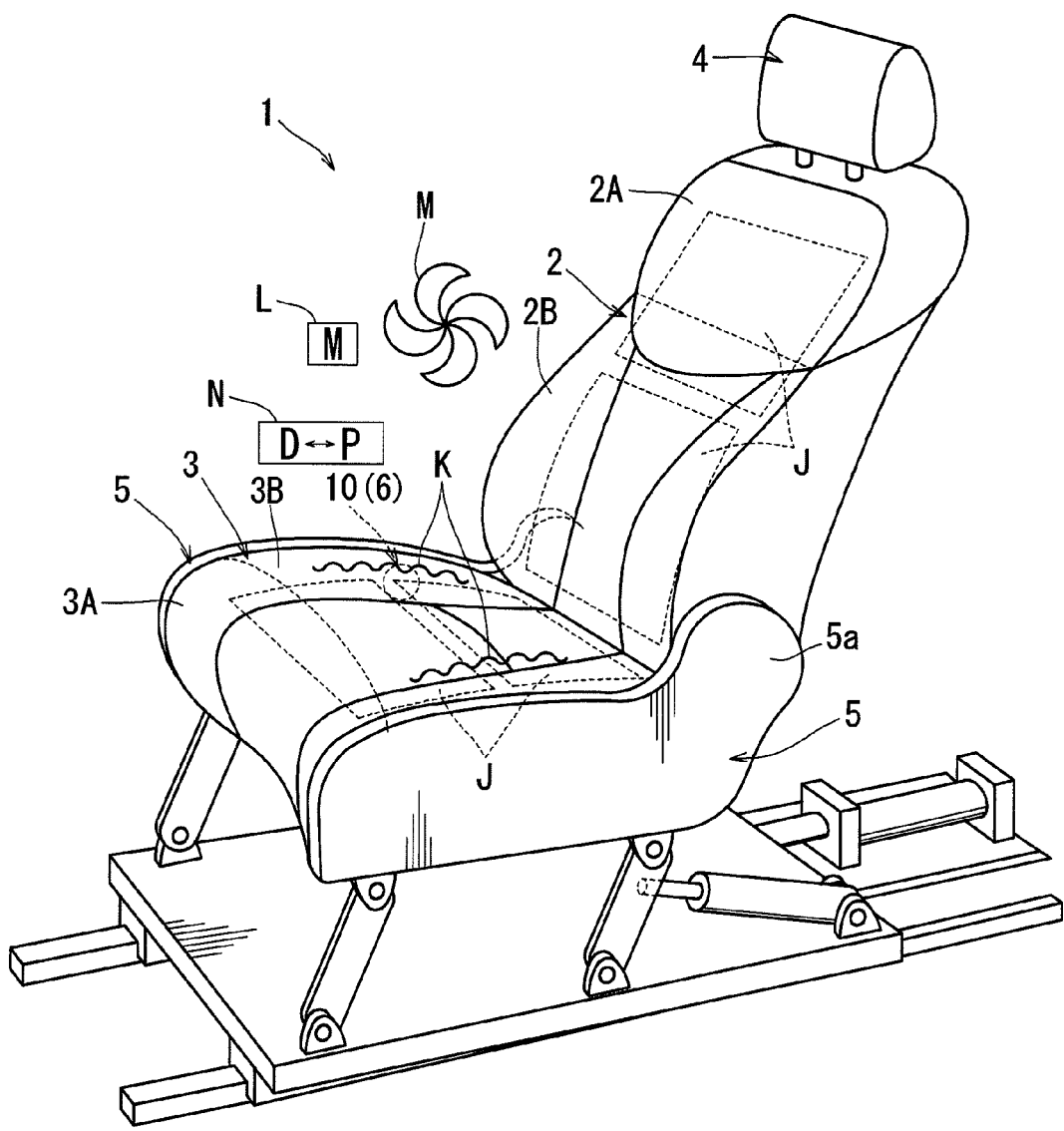
FIG. 3 is a perspective view showing a schematic constitution of an electric function group relating to a comfort improving function.

Here, as shown in FIG. 2 and FIG. 3, the vehicle seat 1 is provided with a plurality of electric functions operated for activation by the operation member 10. Specifically, the electric functions are position adjusting functions (see FIG. 2) capable of moving positions of arrangement of components of the seat back 2 and the seat cushion 3, and a comfort improving function (refer to FIG. 3) capable of improving comfort, such as a vibrator K for massage, a ventilator M, a seat heater J and the like. Here, an electric function group with regard to the position adjusting functions shown in FIG. 2 corresponds to a first electric function group of the invention, and an electric function group with regard to the comfort improving function shown in FIG. 3 corresponds to a second electric function group of the invention.

Here, the above-described respective electric functions will be explained successively. That is, as shown in FIG. 2, within the seat back 2, a head rest lifting and lowering device A capable of moving to lift and lower the head rest 4 mounted to an upper face portion thereof. Further, within the seat back 2, a seat back middle folding device B capable of folding a back leaning attitude of a seated person to raise the upper body forward is provided. The seat back middle folding device B can raise the upper body of the seated person forwardly to take a middle folding state by moving an upper body support portion 2A supporting the upper body of the back portion of the seated person to fold forward relative to a lower body support portion 2B supporting the lower body.

Further, within the seat back 2, a side support device C is provided and is capable of supporting both side portions of the seated person by moving forwardly to deform both side portions 2C, 2C in the width direction in such manner that the both side portions 2C, 2C are brought to be positioned inwardly. Further, within the seat back 2, a lumbar support device D enabling adjustment of a height position and forward and rearward positions for placing a support plate Da on the waist portion is provided as a device for increasing a strength of supporting the waist portion of the seated person. Further, at a connecting portion between the seat back 2 and the seat cushion 3, a reclining device E enabling to adjust a back leaning angle of the seat back 2.

Further, within the seat cushion 3, a cushion front portion movable device F is provided and is capable of adjusting a length in forward and rearward directions of the seat cushion 3 and a height position of a seat face of a front portion 3A divided in forward and rearward directions by moving the front portion 3A forwardly, rearwardly, upwardly and downwardly relative to a rear portion 3B. Further, on the lower side of the seat cushion 3, a lifter device G capable of adjusting a height position of the seat cushion 3 (the entire vehicle seat 1) relative to a vehicle floor face is provided. The lifter device G is constituted to adjust a seating height position of the seat cushion 3 due to the operation of a link mechanism portion Ga connecting between a moving base Gc installed on the vehicle floor and the seat cushion 3 to pivot to rise and fall by the operation of an actuator Gb.

Further, a lower portion of the seat cushion 3 is provided with a slide device H capable of sliding to move a seating position of the seat cushion 3 (the entire vehicle seat 1) relative to the vehicle floor face. The slide device H has a constitution in which an upper rail Ha disposed to be fixed integrally with a lower face portion of the above-described moving base Gc is fitted to a lower rail Hb disposed to be fixed onto the vehicle floor face to be able to slide to move in forward and rearward directions of the vehicle. Further, the upper rail Ha is operated to slidably move in forward and rearward directions by the operation of an actuator Hc.

Further, as shown in FIG. 3, within the vehicle seat 1, a seat heater J capable of warming up a contact face, such as the back portion or the waist portion and the thigh portion of the seated person. The seat heater J is respectively arranged within an upper body support portion 2A and a lower body support portion 2B of the above-described seat back 2, and the front portion 3A and the rear portion 3B of the seat cushion 3. Further, the seat heater J is configured to enable selection of an operation portion, to which the warming function is applied, in accordance with a purpose of use as described later with reference to FIG. 14.

Further, referring back to FIG. 3, within the vehicle seat 1, the vibrator K capable of applying a massage effect due to vibrations to the seated person by vibrating the seating face portion of the seat cushion 3 is provided. Further, within vehicle seat 1, there is provided a seat memory L capable of switching a back leaning angle of the seat back 2 and a state of arrangement of a slide position in forward and rearward directions of the seat cushion 3 or the like to a previously registered attitude state.

The seat memory L can switch an attitude state of the vehicle seat 1 to the registered attitude state by selecting one from a previously registered plurality (for example, three) of registered contents. Further, in the seat memory L, it is possible to register not only the states with regard to the function related to the above-described position adjusting function but also an ON/OFF state of the electric function related to the comfort improving function, a strong or weak state of outputs thereof and the like.

Further, the vehicle seat 1 is provided with the ventilator M as a blower for ventilating air within the vehicle. Further, the vehicle seat 1 is provided with a D•P switch N capable of switching an operational object of the electric function between the vehicle seat 1 that is the driver's seat and a seat on a passenger seat side (not illustrated).

According to the electric functions mentioned above, the operational object is selected by operating to pivot the operation member 10 about the axis. Further, according to the electric functions, the electric function selected as the operational object is operated for activation by operating to slidably move the operation member 10 in a diametrical direction.

Further, according to the electric functions, a category of an electric function group to be selected is switched between that of the electric function group with regard to the position adjusting function shown in FIG. 2 and that of the electric function group with regard to the comfort improving function shown in FIG. 3 by carrying out the operation of pushing the operation member 10 in a direction of a center axis of the pivotal movement about the axis. Specifically, at an initial state before carrying out the pushing operation of the operation member 10, the state is that the electric function group with regard to the position adjusting function is selected. And, by carrying out the pushing operation of the operation member 10, the state is switched to the state that the electric function group with regard to the comfort improving function is selected.

Here, according to the electric operating device 6, when the operation of the operation member 10 is left not to be performed for a given period of time (for example, 10 through 20 seconds), the state of selecting the electric function group is returned to an initial state (i.e., the state of selecting the electric function group with regard to the position adjusting function). Therefore, in the state in which the operation of the operation member 10 is left for the given period of time, the state of selecting the electric function group is regarded to be the state where the electric function group with regard to the position adjusting function is always selected, and the determination of the selecting state can easily be carried out. Further, setting is made to select for the initial state the electric function group that is high in frequency of use as the position adjusting function, and therefore, the use of the position adjusting function that is high in frequency of use can be further easily made.

Figure 5:
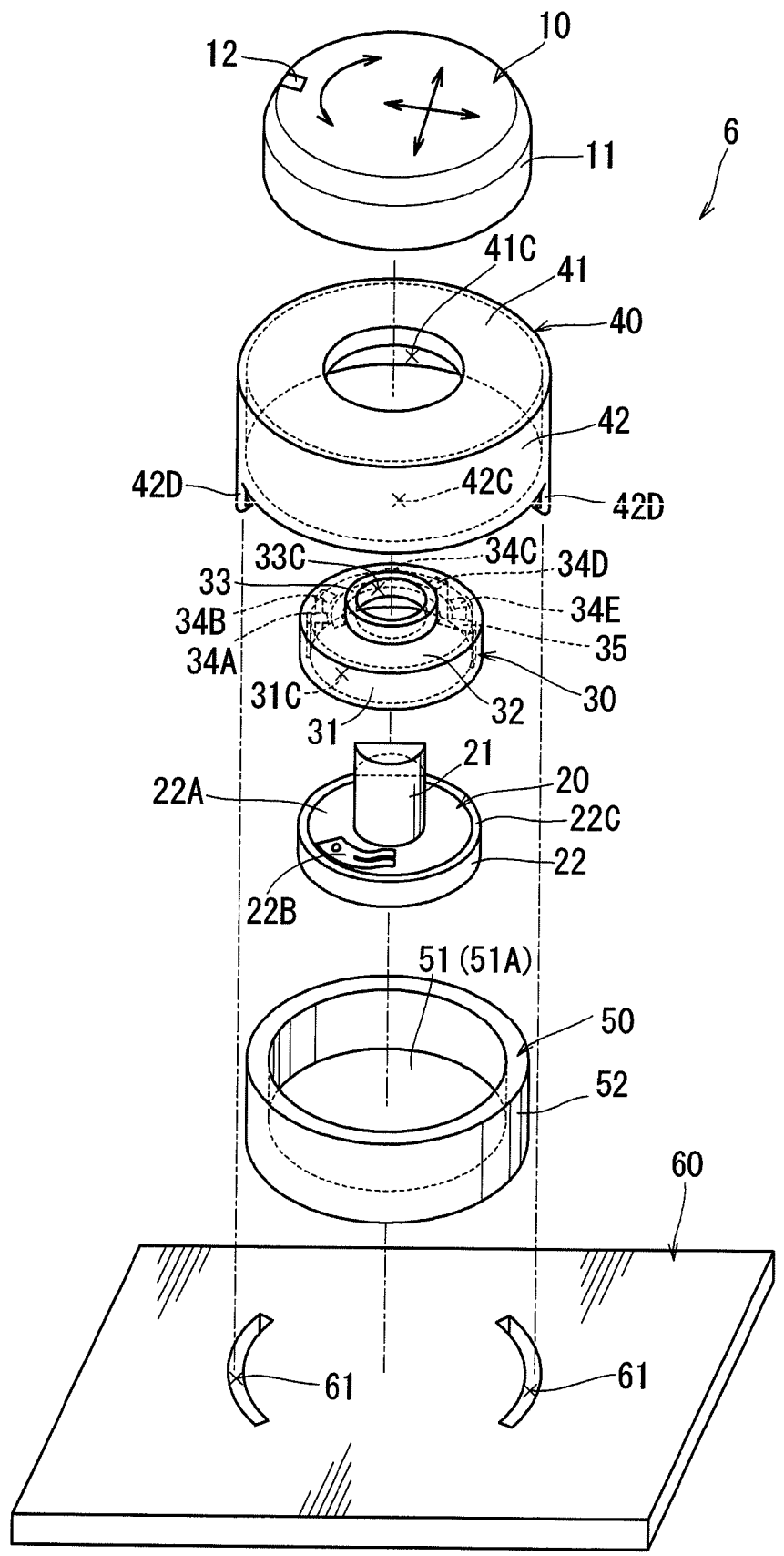
FIG. 5 is an exploded perspective view of the electric operating device.

The constitution of the electric operating device 6 will be concretely explained as follows. As shown in FIG. 5, the electric operating device 6 is constituted to have the operation member 10, a rotating member 20, a slide member 30, an outer peripheral ring 40, an inner peripheral ring 50, and a base 60. Further, a basic constitution of the electric operating device 6 is a publicly-known constitution disclosed in a document, such as JP-A-2005-317377 or the like, and therefore, in the following, the construction of a characteristic portion of the invention will be explained in detail.

First, the operation member 10 will be explained. The operation member 10 is formed in a shape of cylinder, and is assembled with the vehicle seat 1 by being fitted into the rotating member 20. Therefore, the operation member 10 is constructed to be capable of carrying out the pivoting operation about the axis, the slide moving operation in the diametrical direction, and the pushing operation in the axial direction.

Figure 4:
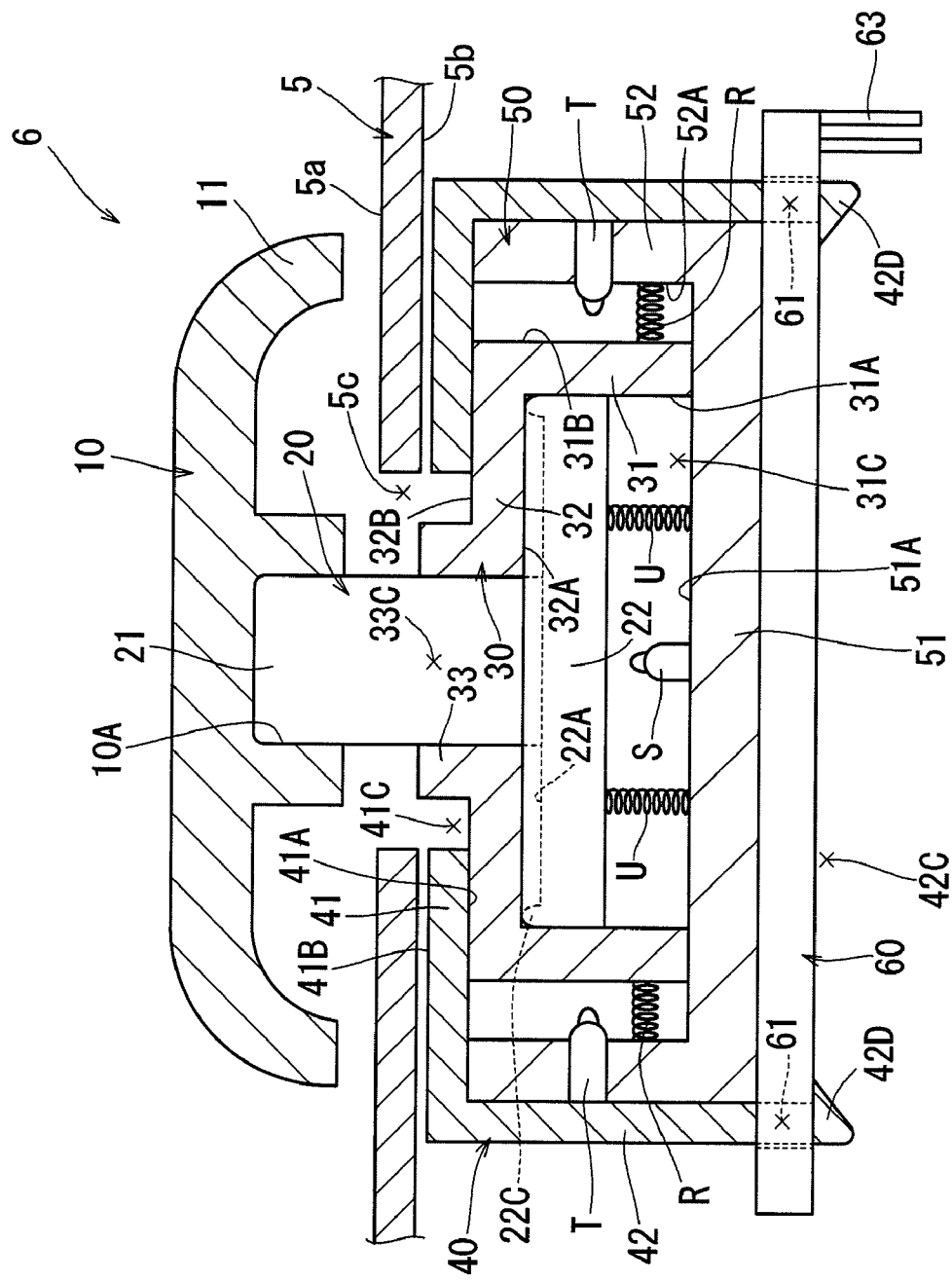
FIG. 4 is a sectional view taken along line IV-IV in FIG. 1 and showing an internal structure of an electric operating device.

Specifically, a bottom face portion of the shape of the cylinder of the operation member 10 is formed with a fitting groove 10A having a half moon cross section, although illustration thereof is omitted in FIG. 4. Further, a front end of the rotating member 20 is formed with a fitting portion 21 (see FIG. 5) having a half moon cross section capable of fitting with the fitting groove 10A. Therefore, by fitting the fitting portion 21 to the fitting groove 10A, the operation member 10 is integrally connected with the rotating member 20.

Here, the operation member 10 is mounted such that a peripheral edge portion 11 thereof is brought into a non-contact condition with an outer side face 5a of the shield 5. Therefore, the operation member 10 can be operated smoothly without receiving a sliding friction by the contact with the shield 5 when it is operated to pivot about the axis or when it is operated to slidably move in the diametrical direction.

Next, the rotating member 20 will be explained. As shown in FIG. 5, the rotating member 20 includes a base seat portion 22 in a shape of a circular plate and the fitting portion 21 in a shape of a cylindrical rod formed on the base seat portion 22. Further, the fitting portion 21 is configured to have a configuration in which its front end portion is partially hollowed in the half moon shape as described above and is fitted to the fitting groove 10A (see FIG. 4) of the operation member 10. Therefore, the rotating member 20 is operated to pivot about the axis, operated to slide to move in the diametrical direction, or operated to be pushed integrally with the operation member 10.

Further, on an illustrated upper face (seat face 22A) of the base seat portion 22, a slider 22B in a shape of a thin curved plate constituted by an electrically conductive member is provided. According to the slider 22B, one end thereof is fixedly attached to the seat face 22A and other end thereof is shaped to be warped back toward an upper side of the paper face. Further, an end portion on a side of a free end warped up to the upper side has a shape divided in a bifurcated manner.

Figure 6:
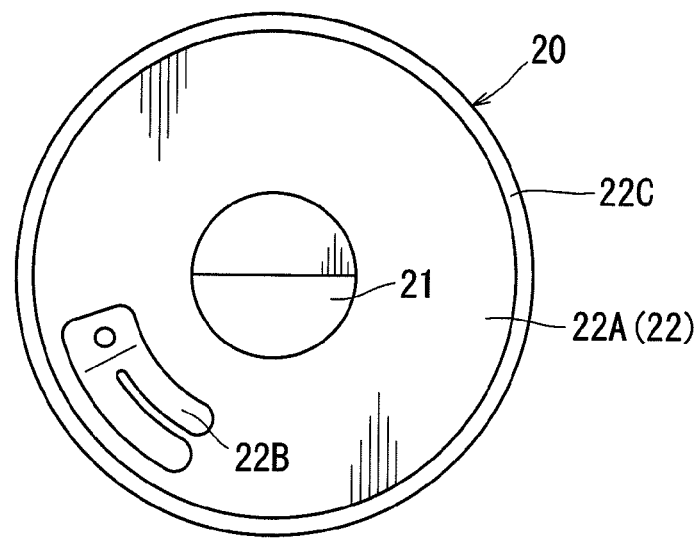
FIG. 6 is a plan view of a rotating member.

As shown in FIG. 6, the slider 22B is provided on the seat face 22A only at one position in a circumferential direction.

Further, referring back to FIG. 5, a peripheral edge portion of the base seat portion 22 is formed with an annular projected edge 22C projecting upward from the seat face 22A. The projected edge 22C is constituted to contact with an inner bottom face 32A of a stepped portion 32 in the state that the rotating member 20 is assembled with the slide member 30 as described later in FIG. 4.

As shown in FIG. 4, the rotating member 20 is resiliently supported by a plurality of compression springs U . . . provided on a bottom plate portion 51 of the inner ring 50 described later in the assembled state of the electric operating device 6. Therefore, the rotating member 20 is held in the state that the slider 22B (not illustrated) is resiliently pressed against the inner bottom face 32A by bringing to the state that the projected edge 22C formed at the peripheral edge portion contacts with the inner bottom face 32A of the stepped portion 32 of the slide member 30.

Further, because of that, the operation member 10 can carry out the pushing operation toward the lower side as illustrated, or a direction of the center axis against the urging of the compression springs U . . . . Further, by stopping the above-described pushing operation, the operation member 10 is returned to the initial position before the pushing operation by the urging of the compression springs U . . . . Here, the structure for returning the operation member 10 to the initial position before the pushing operation by the urging corresponds to a return mechanism of the invention.

Here, each of the compression springs U . . . is constructed such one end thereof is engaged to be attached onto the bottom plate portion 51 of the inner ring 50 and the other end thereof is in contact with a bottom face of the base seat portion 22 of the rotating member 20. Therefore, the compression springs U . . . are in the state that they are fixed to the bottom plate portion 51 of the inner peripheral ring 50 and do not follow the sliding movement of the rotating member 20 in the diametrical direction and the rotating movement about the axis.

Next, referring back to FIG. 5, the slide member 30 will be explained. The slide member 30 is formed in a shape of a stepped cylinder and includes a barrel portion 31 in a shape of a cylinder and the stepped portion 32 and a neck portion 33. By inserting the above-described rotating member 20 from an opening portion 31C opened to a lower side as illustrated of the barrel portion 31, the rotating member 20 is assembled within the cylinder of the slide member 30

In detail, as shown in FIG. 4, the rotating member 20 is assembled with the slide member 30 in the state that the fitting portion 21 projects upward from an opening portion 33C within the cylinder of the neck portion 33. Therefore, the rotating member 20 is assembled in the state that the projecting edge 22C contacts with the inner bottom face 32A of the stepped portion 32.

Here, the size of an inner diameter of the slide member 30 is set to a size for loosely fitting the rotating member 20 within the cylinder. Therefore, although the slide member 30 does not follow the relative pivotal movement about the axis of the rotating member 20, with regard to the sliding movement of the rotating member 20 in the diametrical direction, the slide member 30 is slidably moved in the diametrical direction integrally therewith. At this occasion, the rotating member 20 is pivoted about the axis while causing the projecting edge 22C to slide on the inner bottom face 32A of the stepped portion 32 of the slide member 30.

Figure 7:
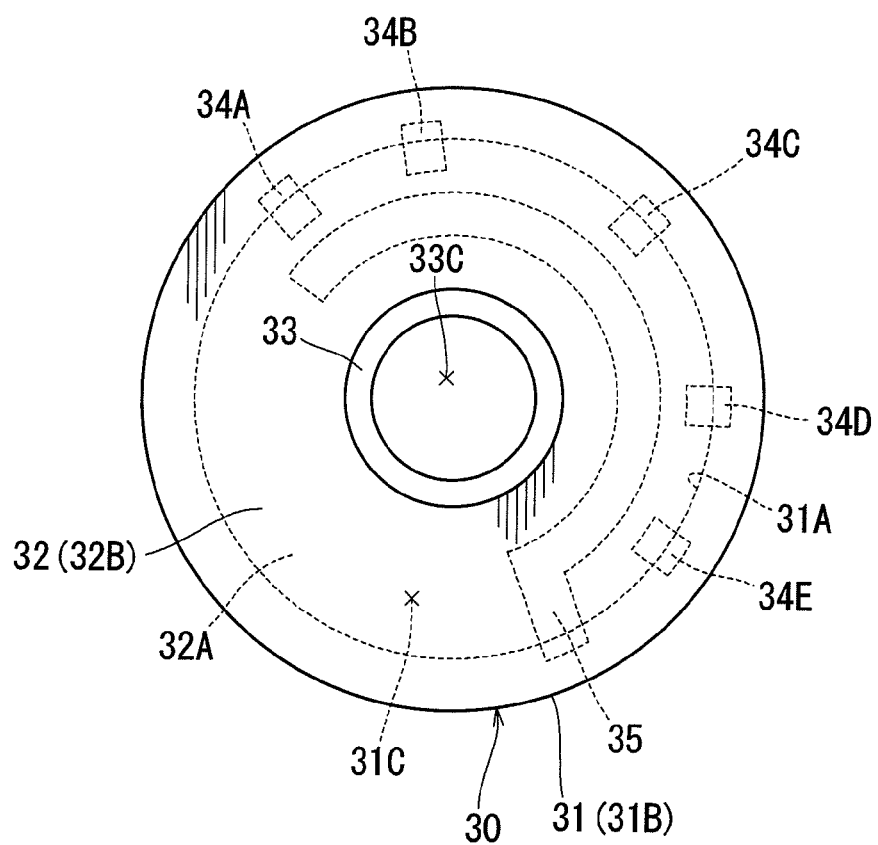
FIG. 7 is a plan view of a slide member.

Here, as shown in FIG. 7, on the inner bottom face 32A of the stepped portion 32, fixed contacts 34A through 34E and a common contact 35 in shapes of flat faces and constituted by electrically conductive members are provided integrally and in flush therewith. The fixed contacts 34A through 34E are disposed to be arranged at five positions in a circumferential direction on the inner bottom face 32A.

On the other hand, the common contact 35 is formed in such a manner as drawing an arc in a circumferential direction passing inner sides of the fixed contacts 34A through 34E with respect to the diametrical direction. The fixed contacts 34A through 34E and the common contact 35 are arranged to be spaced from each other and are electrically connected to terminals 63 provided at the base 60 explained later by wiring through passing an inner peripheral face 31A of the barrel portion 31 of the slide member 30.

Figure 8:
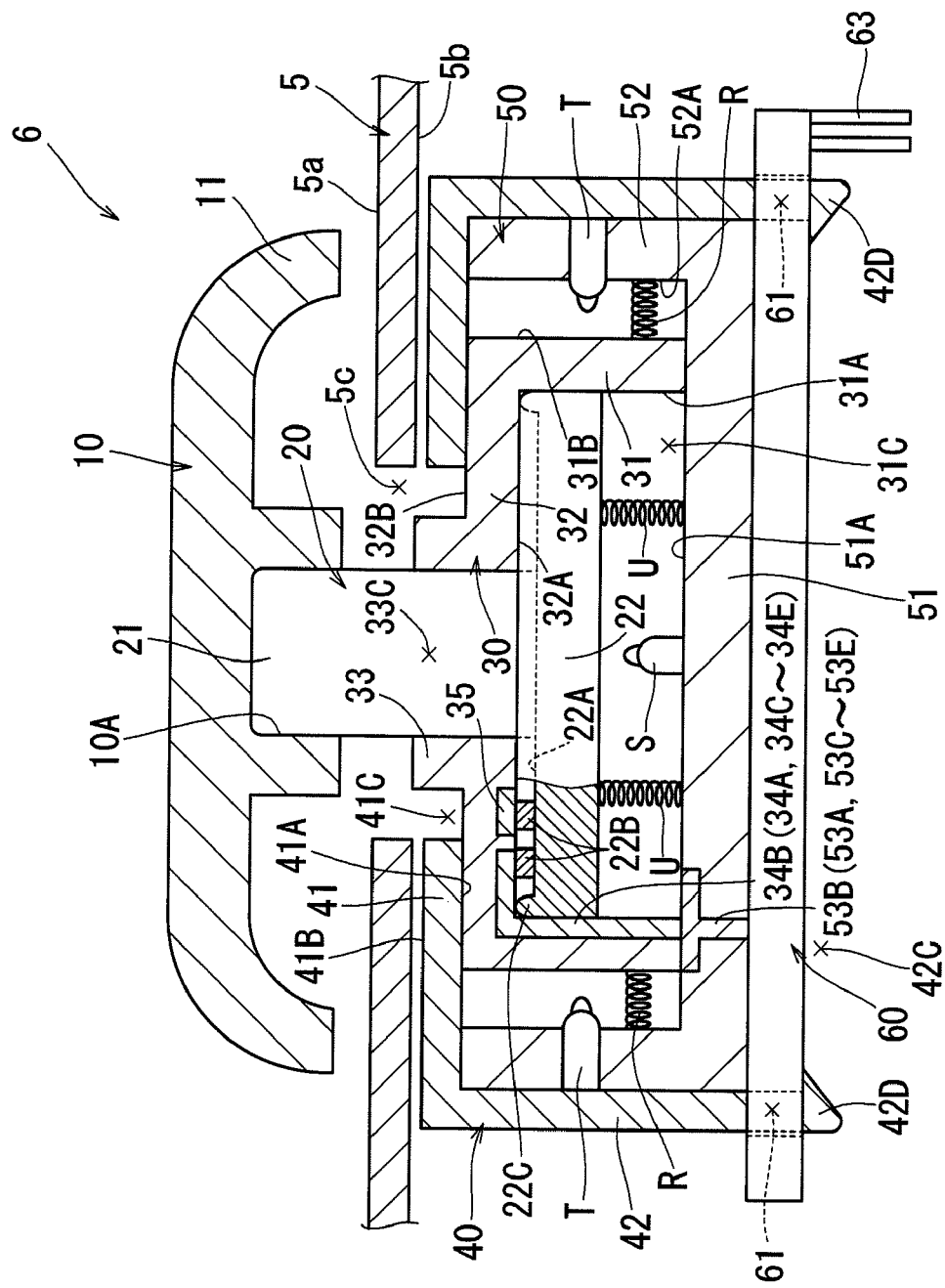
FIG. 8 is a sectional view showing a state in which a slider and a fixed contact are aligned with each other.

In the assembled state, the slide member 30 constituted as described above is in the state of being pressed and deformed to be flexed as the slider 22B provided on the seat face 22A of the rotating member 20 is pressed by the inner bottom face 32A of the stepped portion 32 as shown in FIG. 8. Therefore, the slider 22B is held in the state that its bifurcated end portions are resiliently pressed against any of the common contact 35, and the fixed contacts 34A through 34E provided on the inner bottom face 32A.

Further, when the pivoting operation about the axis of the rotating member 20 is carried out under this state, one of the bifurcated ends of the slider 22B slides in the circumferential direction along the configuration of the common contact 35, while the other of the bifurcated ends slides on the fixed contacts 34A through 34E in the circumferential direction to successively pass them. Therefore, according to the slider 22B, as the rotating member 20 is operated to pivot about the axis, the press contact state with the fixed contacts 34A through 34E is successively switched while the press contact state with the common contact 35 is always maintained.

Here, FIG. 8 shows a state where the slider 22B is aligned with the fixed contact 34B. Under this state, the slider 22B, and the fixed contact 34B and the common contact 35 are brought into a state where they are in press contact with each other to be able to electrically conduct with each other. Further, the rotating member 20 is constituted such that at pivoting positions, where the slider 22B aligns with any of the fixed contacts 34A through 34E, a constant click feeling is given for its pivoting operational force. Therefore, the pivoting operation for bringing the rotating member 20 to align with the above-described pivoting positions can be easily performed.

Next, referring back to FIG. 5, the outer peripheral ring 40 will be explained. The outer peripheral ring 40 is formed in a shape of a cylindrical tube having a top plate portion 41. According to the outer peripheral ring 40, the rotating member 20 and the slide member 30 are assembled within the cylindrical tube as the rotating member 20 and the slide member 30 mentioned above are inserted into a cylindrical tubular portion 42 from a lower opening portion 42C. In detail, as shown in FIG. 4, the slide member 30 is assembled within the cylindrical tube of the outer peripheral ring 40 by bringing the neck portion 33 into an inserted state into a hole of a through hole 41C formed in the top plate portion 41 and by bringing the upper face 32B of the stepped portion 32 into a face contact state with the inner bottom face 41A of the top plate portion 41 of the outer peripheral ring 40.

Further, the outer peripheral ring 40 is assembled into a state where the through hole 41C formed in the top plate portion 41 axially aligns with a through hole 5c formed in the shield 5. According to the outer peripheral ring 40, an upper face 41B thereof is arranged away from an inner side face 5b of the shield 5 so as not to contact therewith.

Further, referring back to FIG. 5, the outer peripheral ring 40 is attached to the base 60 by fitting two engaging claws 42D, 42D, which are formed to project at portions on a side of a lower edge of the cylindrical portion 42, into engaging holes 61, 61 formed through the base 60 described later and so as to be engaged therewith, respectively. As shown in FIG. 4, the outer peripheral ring 40 is attached to the base 60 in the state that the rotating member 20 and the slide member 30 described above as well as the inner peripheral ring 50 described later are assembled within the cylindrical tube.

Here, the cylindrical tubular portion 42 of the outer peripheral ring 40 is formed to have a large inner diameter size permitting the barrel portion 31 of the slide member 30 to slide in a diametrical direction within the cylindrical tube. Further, the through hole 41C formed in the top plate portion 41 is also formed to have a large diameter size permitting the neck portion 33 to move when the above-described slide member 30 is slid to move. Further, when the slide member 30 is moves to slide, the slide member 30 moves to slide in the diametrical direction while an upper face 32B of the stepped portion 32 slides on the inner bottom face 41A of the top plate portion 41 of the outer peripheral ring 40.

Next, referring back to FIG. 5, the inner peripheral ring 50 will be explained. The inner peripheral ring 50 is formed in a shape of a cylindrical tube having the bottom plate portion 51. The inner peripheral ring 50 is assembled within the cylindrical tube as it is inserted into the cylindrical tubular portion 42 of the outer peripheral ring 40 from the lower opening portion 42C. Therefore, as shown in FIG. 4, the inner peripheral ring 50 is assembled in such a state that the slide member 30 and the rotating member 20 described above are interposed between the bottom plate portion 51 and the ceiling plate portion 41 of the outer peripheral ring 40.

In the assembled state of the inner peripheral ring 50, face portions on upper and lower sides of the barrel portion 31 of the slide member 30 are in face contact with the top plate portion 41 and the bottom plate portion 51, respectively. Therefore, the slide member 30 can slide to move without rattling in the diametrical direction between the inner peripheral ring 50 and the outer peripheral ring 40.

Here, four compression springs R . . . are provided between the cylindrical tubular portion 52 of the inner peripheral ring 50 and the barrel portion 31 of the slide member 30. The compression springs R . . . are arranged uniformly at four positions in the circumferential direction to be able to urge the barrel portion 31 toward a center position with respect to a radius direction of the cylindrical tubular portion 52. Therefore, when the slide member 30 is slid in any of diametrical directions against the urging of the compression springs R . . . , stopping the slide moving operation causes the slide member 30 to return to the center position of the cylindrical tubular portion 52 due to the urging by the compression springs R . . . .

Further, as shown in FIG. 4, four slide detecting switches T . . . (slide direction detecting device) are arranged uniformly in a circumferential direction between the cylindrical tubular portion 52 and the barrel portion 31. The slide detecting switches T . . . are disposed to be embedded into the cylindrical tubular portion 52 and are in the state that their front end portions project radially inwardly from an inner peripheral face 52A. Here, the four slide detecting switches T . . . are arranged at two positions to be oriented in forward and rearward directions of the vehicle seat 1 (see FIG. 1) and two positions to be oriented in upward and downward directions.

Figure 9:
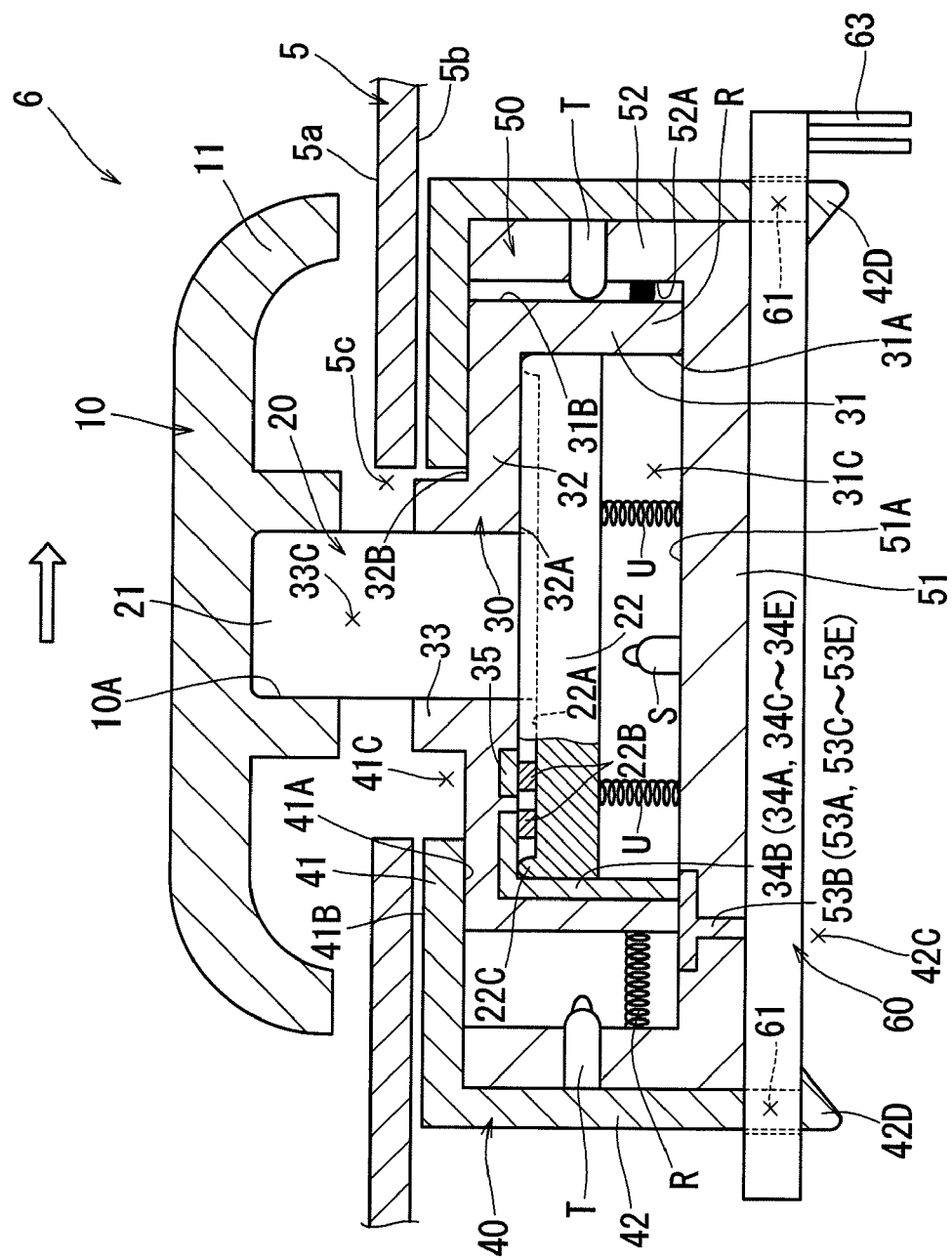
FIG. 9 is a structural view showing a state of moving to slide an operation member in a right direction in the paper face from the state of FIG. 8.

Therefore, by slidably moving the operation member 10 in any of forward, rearward, upward and downward directions of the vehicle seat 1 (see FIG. 1), as shown in FIG. 9, the outer peripheral face 31B of the barrel portion 31 of the slide member 30 is pushed to be contacted with any of the slide detecting switches T . . . , so that its slide moving operation is detected.

Here, as shown in FIG. 8, stationary placed contacts 53A through 53E constituted by electrically conductive members are provided on the upper face 51A of the bottom plate portion 51. The stationary placed contacts 53A through 53E are disposed at five positions in the circumferential direction, at which the above-described fixed contacts 34A through 34E are disposed. The stationary placed contacts 53A through 53E always electrically conductively contact with lower end portions of the respective fixed contacts 34A through 34E mentioned above, which extend to lower edge side portions of the barrel portion 31 of the slide member 30 sliding on the upper face 51A of the bottom plate portion 51.

The stationary placed contacts 53A through 53E are formed to spread in a direction within a plane of the upper face 51A to be able to always contact with the respective fixed contacts 34A through 34E even when the slide member 30 is moved to slide in forward, rearward, upward and downward directions on the upper face 51A of the bottom plate portion 51. Further, although the illustration is omitted, a stationary placed contact similar to the stationary placed contacts 53A through 53E is provided also at a position for contacting with a lower end portion of the common contact 35 extended to a portion on the lower edge side of the barrel portion 31 of the slide member 30.

Further, as shown in FIG. 4, a push switch S (push operation detecting device) is provided between the bottom plate portion 51 of the inner peripheral ring 50 and the base seat portion 22 of the rotating member 20. The push switch S is disposed to be embedded into the bottom plate portion 51 and is in the state that its front end portion projects inn an upward direction as illustrated (axial direction) from the upper face 51A. Therefore, as shown in FIG. 10, by the operation of pushing the operation member 10 in the axial direction, the base seat portion 22 of the rotating member 20 is pushed to contact with the push switch S, so that the push operation is detected.

Further, referring back to FIG. 5, the base 60 will be explained. The base 60 is formed in a shape of a plate and is integrally assembled with the outer peripheral ring 40 by fitting the engaging claws 42D, 42D of the above-described outer peripheral ring 40 into two engaging holes 61, 61 formed to penetrate the plate in a thickness direction.

Here, as shown in FIG. 4, the base 60 is provided with the terminals 63 electrically connected to the slide detecting switches T . . . embedded into the cylindrical tubular portion 52 of the inner peripheral ring 50, the push switch S, the fixed contacts 34A through 34E (see FIG. 8) embedded into the stepped portion 32, and the common contact 35.

Figure 10:
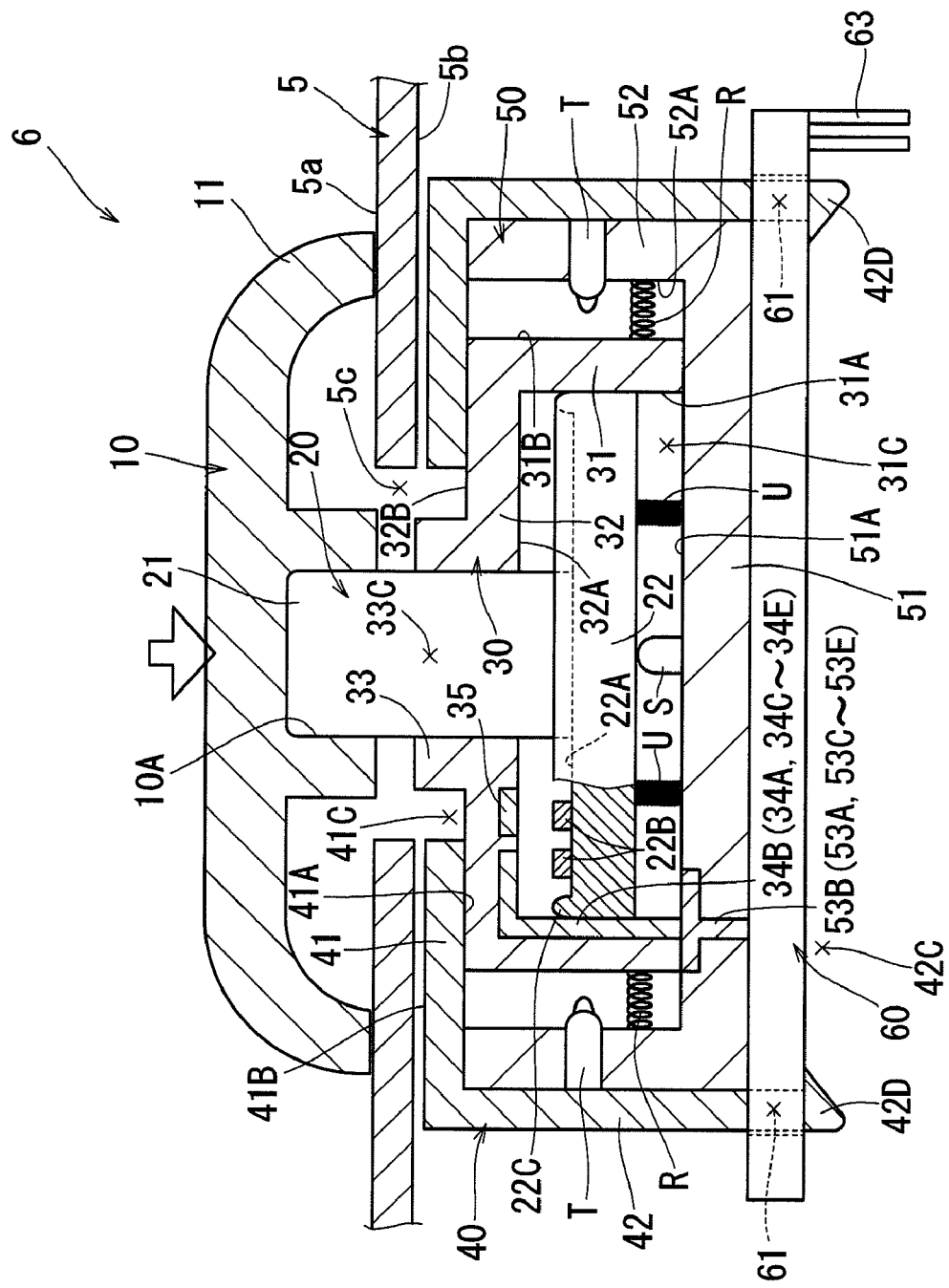
FIG. 10 is a structural view showing a state of operating to push the operation member from the state of FIG. 8.

As shown in FIG. 9 and FIG. 10, the terminal 63 are configured to transmit slide position information when any of the slide detecting switches T . . . is pushed down by the operation of slidably moving the operation member 10 in the diametrical direction, push operation information of the operation member 10 when the push switch S is pushed down, and rotational position information when the slider 22B is brought to electrically conductively contact in face with any of the common contact 35 and the fixed contacts 34A through 34E by the operation of pivoting the operation member 10 about the axis, to the control portion not shown.

According to the electric operating device 6 having the above-described constitution, by the operation of pivoting the operation member 10 about the axis or sliding to move the operation member 10 in the diametrical direction, a state of selecting the electric function is switched or the electric functions are operated for activation as follows. Further, the electric operating device 6 switches the category of the electric function group, which is an object of selection, as follows by the operation of pushing the operation member 10.

Figure 11:
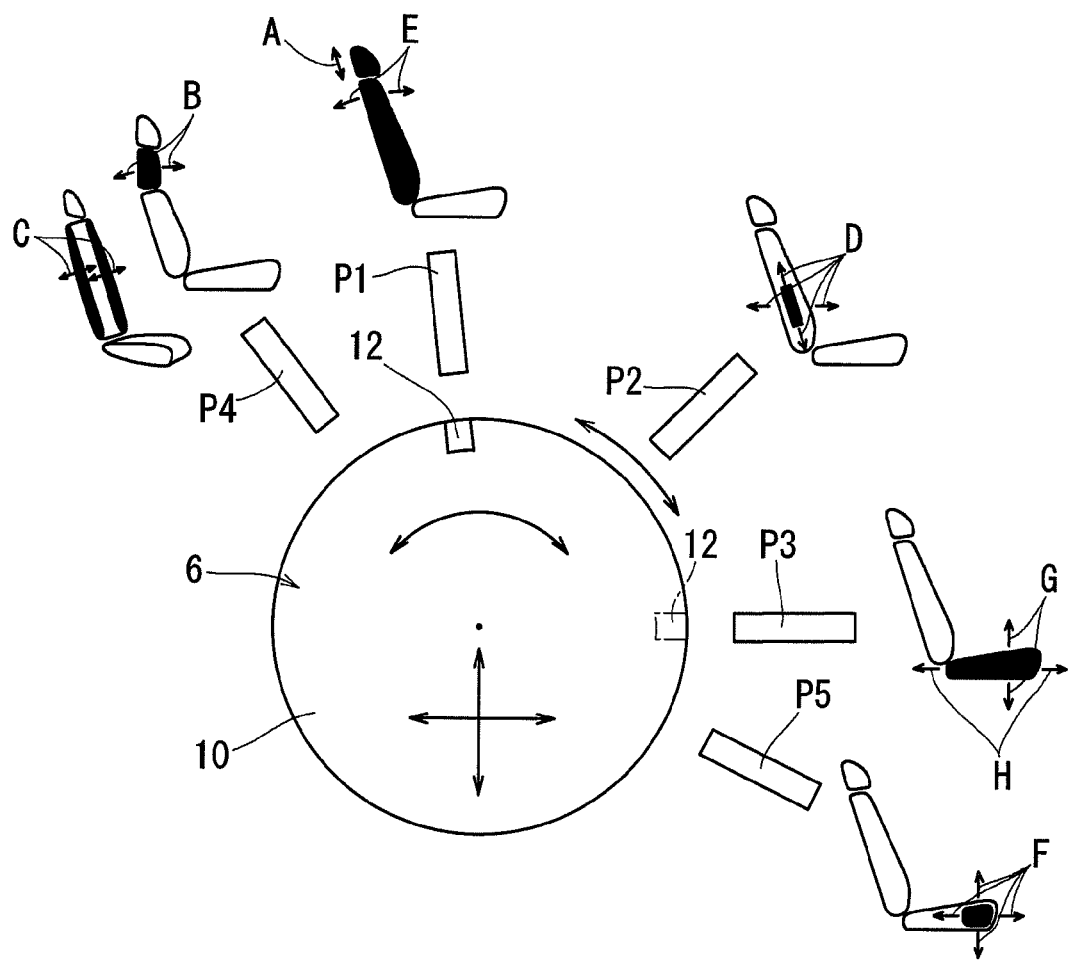
FIG. 11 is a schematic view showing an electric function mode switching structure of the operation member.

Here, as shown in FIG. 11, five positions P1 through P5 are set for pivoting positions of the operation member 10. The positions P1 through P5 are pivoting positions at which the slider 22B and the fixed contacts 34A through 34E are brought to electrically conductively contact with each other in FIG. 8 when the operation member 10 is set to the pivoting positions.

Here, the position P1 is set to a pivoting position at which an index portion 12 set to the operation member 10 is on the upper side and directed slightly rearwardly to indicate an attitude direction of the seat back 2 normally used. Further, the position P2 is set to a pivoting position substantially at a midpoint between the position P1 and a position P3 described later. Further, the position P3 is set to a pivoting position at which the index portion 12 is directed forwardly to indicate an attitude direction of the seat cushion 3.

Further, the position P4 is set to a pivoting position at which the index portion 12 is directed to the rear side relative to the position P1, that is, a pivoting position indicating a direction of reclining the seat back 2 rearwardly. Further, the position P5 is set to a pivoting position at which the index portion 12 is directed downward relative to the position P3, that is, a pivoting position of indicating a direction of downwardly inclining the attitude direction of the seat cushion 3.

First, in a state that the index portion 12 of the operation member 10 is set to the position P1 indicating the attitude direction of the seat back 2, based on the rotational position information, a state of selecting the reclining device E and the head rest lifting and lowering device A as operational objects is resulted.

Figure 12:
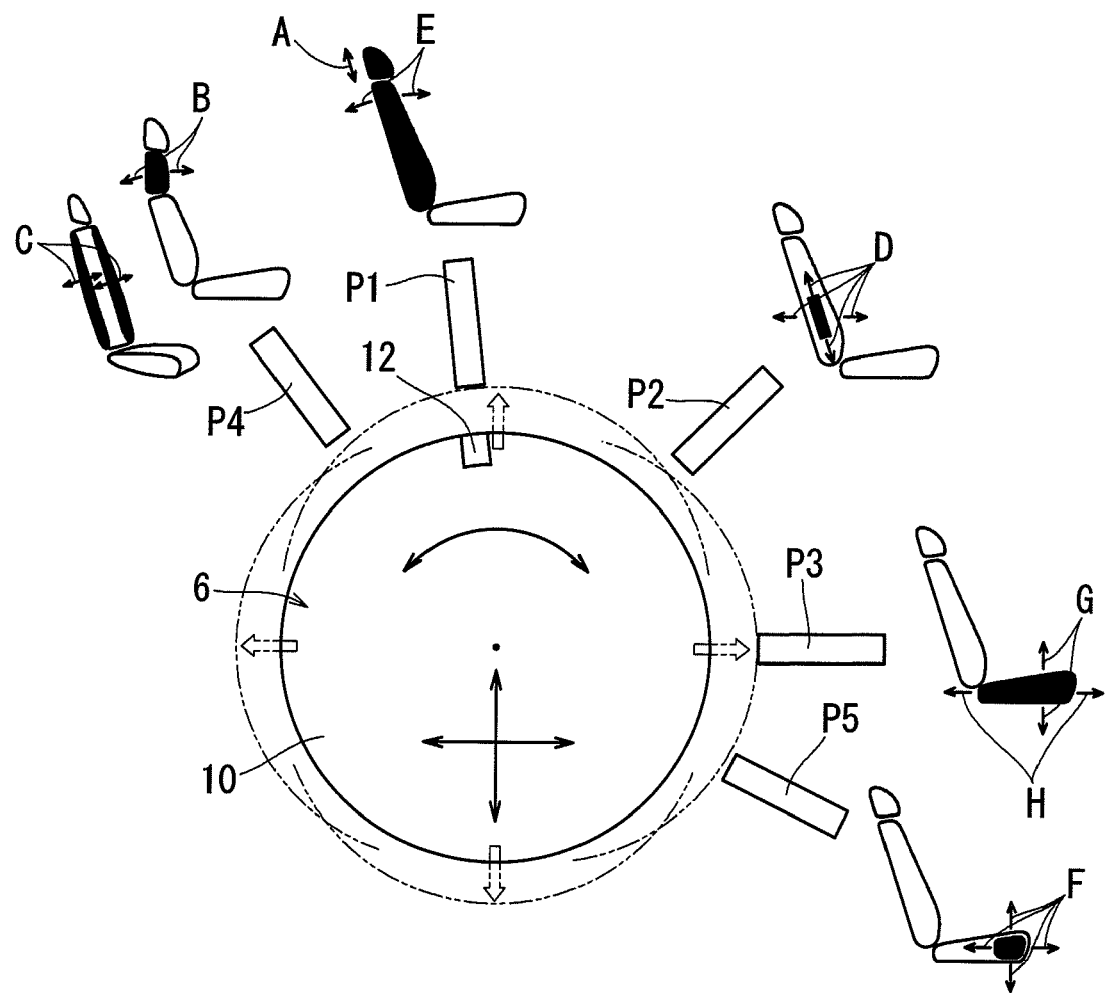
FIG. 12 is a schematic view showing an activation control structure of the operation member.

Further, in this state, when the operation member 10 is slid to move forwardly of the vehicle seat 1 (see FIG. 2), that is, rightwardly in the paper face (diametrical direction) of FIG. 12, the reclining device E is electrically operated, and the back leaning angle of the seat back 2 is varied in a forwardly tilting direction that is the same as the operating direction of the operation member 10. Thus, when the above slide moving operation is performed, the slide detection switch T (see FIG. 9) disposed on the side of its movement is pushed down, and based on this slide position information, the reclining device E is electrically operated.

Further, when the slide moving operation of the operation member 10 is stopped, the operation member 10 is returned to the center position taken before the operation, and the operation of the reclining device E is stopped. Further, when the operation member 10 is moved to slide rearwardly of the vehicle seat 1 (see FIG. 2), that is, leftwardly in the paper face (diametrical direction) of FIG. 12, based on the slide position information, the back leaning angle of the seat back 2 is varied in a rearwardly tilting direction same as the operation direction of the operation member.

Further, when the operation member 10 is slid to move upward of the vehicle seat 1 (see FIG. 2), that is, upwardly of the paper face of FIG. 12 (diametrical direction), based on the slide position information, the head rest lifting and lowering device A is electrically operated, and a height position of the head rest 4 is pushed up upwardly same as the operating direction of the operation member 10.

Further, when the slide moving operation of the operation member 10 is stopped, the operation member 10 is returned to the center position taken before the operation, and the operation of the head rest lifting and lowering device A is stopped.

Further, when the operation member 10 is slid to move downwardly of the vehicle seat 1 (see FIG. 2), that is, downwardly in the paper face of FIG. 12 (diametrical direction), based on the slide position information, the height position of the head rest 4 is pulled down downwardly same as the operating direction of the operation member 10.

Next, when the index portion 12 is set to the position P2 by operating to pivot the operation member 10 about the axis, based on the rotational position information, a state of selecting the lumbar support device D as the operational object is resulted. Further, in this state, when the operation member 10 is slid to move in the forward, rearward, upward or downward direction with respect to the vehicle seat 1 (see FIG. 2), based on the slide position information, the lumbar support device D is electrically operated.

Therefore, a position of the support plate Da supporting the waist portion of the seated person is operated to move in the forward, rearward, upward or downward direction same as the operating direction of the operation member 10. Further, by stopping the slide moving operation of the operation member 10, similar to the above-described operation structure, the operation of the lumbar support device D is stopped.

Next, when the index portion 12 is set to the position P3 indicating the attitude direction of the seat cushion 3 by operating to pivot the operation member 10 about the axis, based on the rotational position information, a state of selecting the slide device H and the lifter device G as the operational objects is resulted.

Further, in this state, when the operation member 10 is slid to move forwardly or rearwardly of the vehicle seat 1 (see FIG. 2), based on the slide position information, the slide device H is electrically operated. Therefore, a position of the seat cushion 3 (the entire vehicle seat 1) opposed to the vehicular floor face is varied by the sliding movement in the forward or rearward direction same as the operating direction of the operation member 10.

Further, when the operation member 10 is slid to move to upwardly or downwardly of the vehicle seat 1 (see FIG. 2), based on the slide position information, the lifter device G is electrically operated. Therefore, the height position of the seat cushion 3 (the entire vehicle seat 1) opposed to the vehicular floor face is operated to move in the upward or downward direction same as the operating direction of the operation member 10. Further, by stopping the slide moving operation of the operation member 10, similar to the above-described operation structure, the operation of the slide device H or the lifter device G is stopped Next, when the index portion 12 is set to the position P4 indicating the position directed rearwardly of the seat back 2 by operating to pivot the operation member 10 about the axis, based on the rotational position information, a state of selecting the seat back middle folding device B and the side support device C as the operational objects is resulted.

Further, in this state, when the operation member 10 is slid to move forwardly or rearwardly of the vehicle seat 1 (see FIG. 2), based on the slide position information, the seat back middle folding device B is electrically operated. Therefore, the upper body support portion 2A of the seat back 2 supporting the upper body of the back portion of the seated person is moved relative to the lower body support portion 2B to fold in the forward direction or is returned in the rearward direction same as the operating direction of the operation member 10.

Further, when the operation member 10 is slid to move upwardly or rearwardly of the vehicle seat 1 (see FIG. 2), based on the slide position information, the side support device C is electrically operated. Therefore, both side portions 2C, 2C in the width direction of the seat back 2 are deformed to move forwardly in such a manner that they move toward each other to the inner side, or return rearwardly. Further, similar to the above-described operation structure, the operation of the seat back middle folding device B or the side support device C is stopped by stopping the slide moving operation of the operation member 10.

Next, when the index portion 12 is set to the pivoting position of the position P5 by operating to pivot the operation member 10 about the axis, based on the rotational position information, a state of selecting the cushion front portion movable device F as the operational object is resulted. Further, in this state, when the operation member 10 is moved forwardly or rearwardly of the vehicle seat 1 (see FIG. 2) or upwardly or downwardly of the vehicle seat 1, based on the slide position information, the cushion front portion movable device F is electrically operated.

Therefore, the front portion 3A of the seat cushion 3 is operated to move relative to the rear portion 3B in the forward or rearward direction or upward or downward direction same as the operation direction of the operation member 10. Further, similar to the above-described operation structure, by stopping the slide moving operation of the operation member 10, the operation of the cushion front portion movable device F is stopped.

Figure 13:
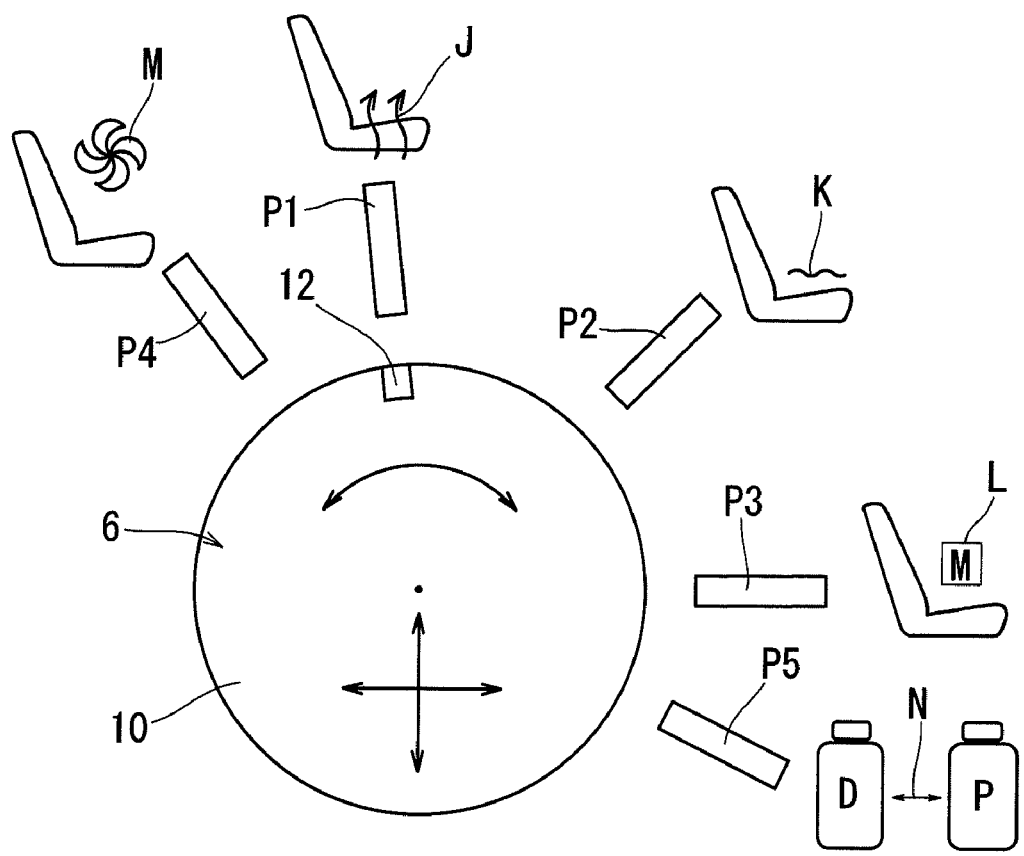
FIG. 13 is a schematic view showing an electric function category switching structure of the operation member.

Next, when the operation of pushing the operation member 10 is carried out, as shown in FIG. 13, the category of the electric function group is switched from the electric function group with regard to the above-described position adjusting function to the electric function group with regard to the comfort improving function as illustrated. Therefore, for example, in the state of setting the index portion 12 of the operation member 10 to the pivoting position of the position P1, based on the rotational position information, a state of selecting the seat heater J as the operational object is resulted.

Figure 14:
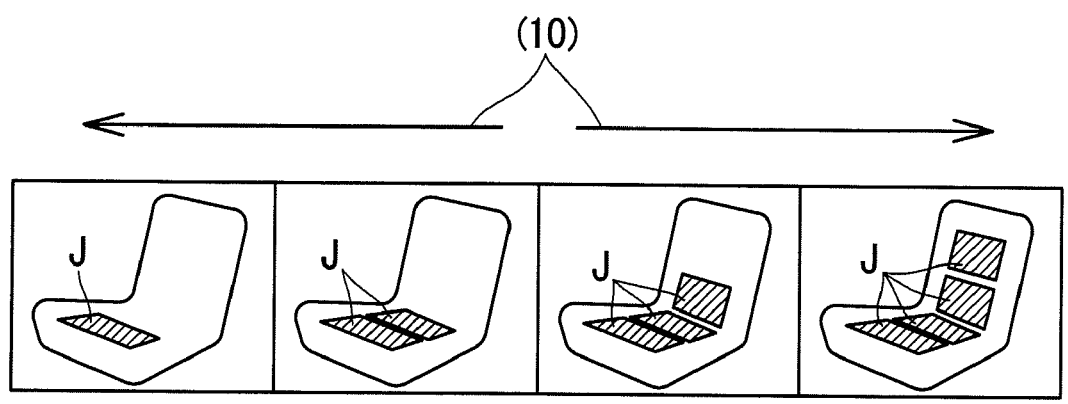
FIG. 14 is a schematic view showing a setting mode of switching an activating portion of a seat heater.

According to the seat heater J, as shown in FIG. 14, by sliding to move the operation member 10 forwardly or rearwardly of the vehicle seat 1 (see FIG. 3), the operated portion is switched from among for set modes as illustrated. Further, according to this embodiment, the set mode can be switched from among four modes including a mode of warming only the front portion 3A of the seat cushion 3, a mode of warming the entire seat cushion 3 (front portion 3A and rear portion 3B), a mode of warming the entire seat cushion 3 and the lower body support portion 2B of the seat back 2, and a mode of warming the seat cushion 3 and the entire seat back 2 (lower body support portion 2B and upper body support portion 2A). Further, the kinds or the number of set modes can suitably be changed in accordance with the purpose of use.

Further, in this state, when the operation member 10 is slid to move upwardly of the vehicle seat 1 (see FIG. 3), that is, upwardly in the paper face (diametrical direction) of FIG. 13, the seat heater J is switched to ON state. Therefore, the portion in accordance with the above-described set mode is warmed. Further, by sliding to move the operation member 10 forwardly or rearwardly of the vehicle seat 1 (see FIG. 3) in the ON state of the seat heater J, the activating portion can be switched. Further, by sliding to move the operation member 10 downwardly of the vehicle seat 1 (see FIG. 3), the seat heater J is switched to an OFF state.

Next, when the index portion 12 is set to the position P2 by operating to pivot the operation member 10 about the axis, based on the rotational position information, a state of selecting the vibrator K as the operational object is resulted. Further, when the operation member 10 is slid to move upwardly of the vehicle seat 1 (see FIG. 3), the vibrator K is switched to the ON state. Further, by sliding to move the operation member 10 forwardly or rearwardly, a strongness or weakness of the output of the vibrator K can be adjusted in a stepwise manner. Further, by sliding to move the operation member 10 downwardly, the vibrator K is switched to the OFF state.

Next, when the index portion 12 is set to the position P3 by operating to pivot the operation member 10 about the axis, based on the rotational position information, a state of selecting the seat memory L as the operational object is resulted. Further, in this state, when the operation member 10 is slid to move forwardly or rearwardly of the vehicle seat 1 (see FIG. 3), the set mode can be switched. Further, by sliding to move the operation member 10 upwardly, the vehicle seat 1 is switched to the attitude or the position of the selected set mode. Further, by sliding to move the operation member 10 downwardly of the vehicle seat 1 (see FIG. 3), the vehicle seat 1 is returned to an initial attitude state.

Next, when the index portion 12 is set to the position P4 by operating to pivot the operation member 10 about the axis, based on the rotational position information, a state of selecting the ventilator M as the operational object is resulted. Further, in this state, when the operation member 10 is slid to move upwardly of the vehicle seat 1 (see FIG. 3), the ventilator M is switched to the ON state. Further, by sliding to move the operation member 10 forwardly or rearwardly, the strongness or weakness of the output of the ventilator M can be adjusted in a stepwise manner. Further, by sliding to move the operation member 10 downwardly, the ventilator M is switched to the OFF state.

Next, when the index portion 12 is set to the position P5 by operating to pivot the operation member 10 about the axis, based on the rotational position information, a state of selecting the D•P switch N as the operational object is resulted. Further, in this state, when the operation member 10 is slid to move forwardly or rearwardly of the vehicle seat 1 (see FIG. 3), the object of the activating operation of the electric function can be switched between the driver's seat (vehicle seat 1) and the passenger seat (not illustrated). Further, the operational object can also be switched by sliding to move the operation member 10 upwardly or downwardly of the vehicle seat 1 (see FIG. 3).

Further, according to the electric operating device 6, after carrying out the pushing operation of the operation member 10, by leaving the electric operating device 6 for a given period of time without carrying out the operation of the operation member 10, such as the operation for pivoting about the axis or the operation for sliding to move in the diametrical direction, the state of selecting the category of the electric function group is returned to the state of selecting the electric function group related to the position adjusting function or the initial state. The control for returning the state of selecting the category of the electric function group to the initial state is carried out, for example, by setting a timer to the control portion (not illustrated) that receives transmission of various kinds of operation information of the operation member 10.

In this way, according to the electric operating device of the vehicle seat of this embodiment, by operating to pivot the operation member 10 about the axis to switch the pivoting position, the electric function as the operational object is selected from among the plurality of the electric functions provided at the vehicle seat 1. Further, by operating to slide to move the operation member 10 in the diametrical direction to switch the slide position, the electric function selected as the operational object is operated for activation. That is, by operating the single operation member 10, both of selection of the electric function and the activating operation thereof can be carried out.

Further, in the case that the number of the electric functions is increased, it can be dealt by increasing the set number of the pivoting positions for selecting the electric functions by the pivoting operation about the axis of the operation member 10. Further, by operating to push the operation member 10, the state of selecting the electric function group is switched. Therefore, the set number of the pivoting positions of the operation member 10 for selecting the electric functions can be increased without increasing an installing space of the electric operating device 6. Further, the operation member 10 having operated to be pushed is returned to the initial position taken before the pushing operation by the urging, and therefore, the pushing operation of the operation member 10 can always be carried out by the same operation feeling.

Further, by operating to slide to move the operation member 10 upwardly and downwardly of the vehicle seat 1 in the state of selecting the electric function related to the comfort improving function, ON/OFF of the electric function is switched. Further, by operating to slide to move the operation member 10 forwardly and rearwardly of the vehicle seat 1, strongness or weakness of the output or the activating portion of the electric function is switched. In this way, the operation for activation of the electric function related to the comfort improving function can be carried out with an operation feeling that is easy to be imaged, and the operation can be easily carried out.

Embodiment 2

Figure 15:
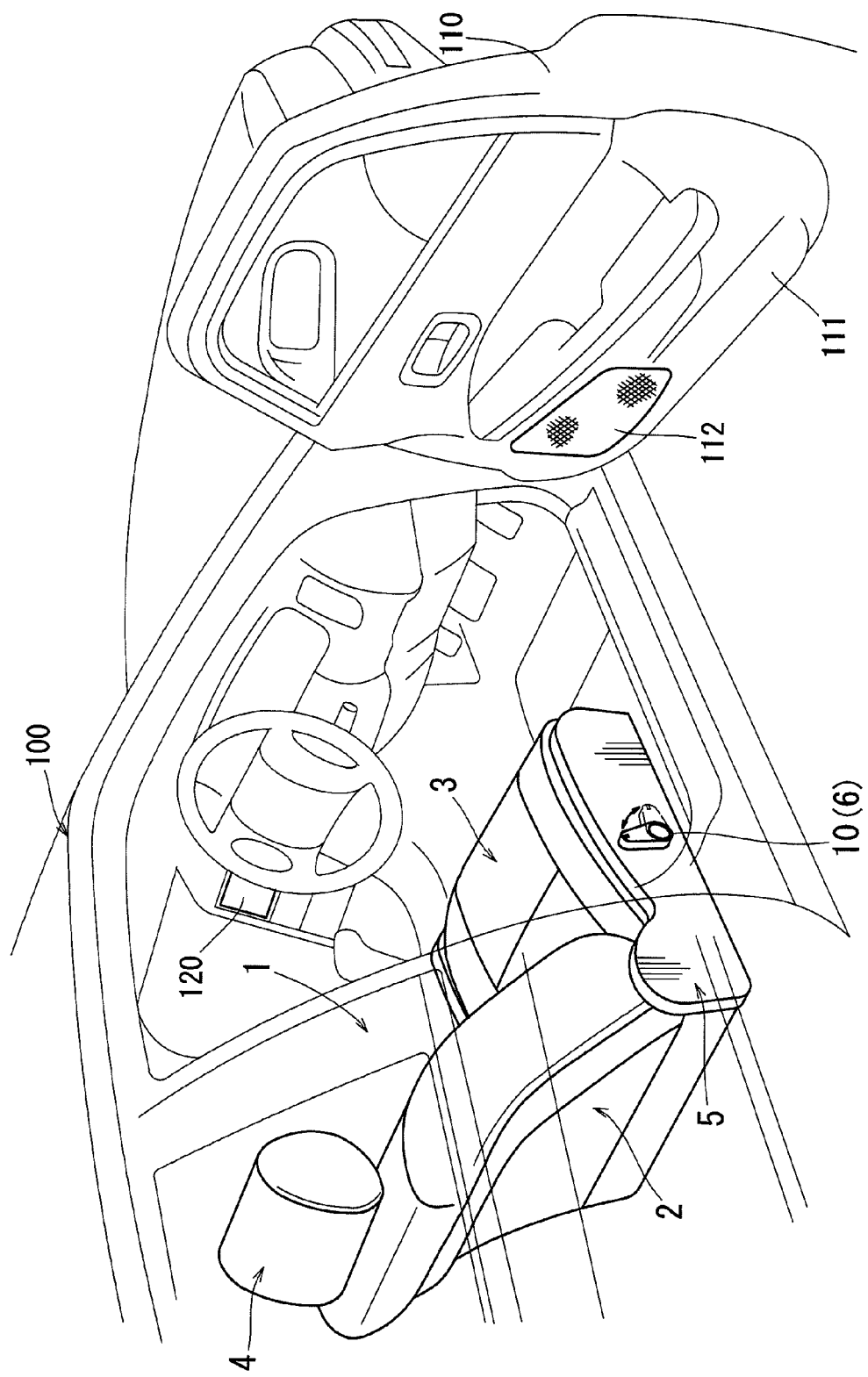
FIG. 15 is a perspective view showing a schematic constitution of an electric operating device of a vehicle seat of Embodiment 2.

Subsequently, an electric operating device of a vehicle seat of Embodiment 2 will be explained with reference to FIG. 15 through FIG. 17. Further, in the following explanation, portions having constitutions and operations substantially the same as those of the electric operating device of the vehicle seat explained in Embodiment 1 are labeled with the same symbols, an explanation thereof will be omitted, and a detailed explanation will be given to different portions.

According to this embodiment, the operation member 10 is formed in a shape elongated in the diametrical direction. Therefore, a pivoting position of the operation member 10 is indexed by the elongating direction. In detail, an end portion of the operation member 10 on the side of indexing the pivoting position is formed such that its shape becomes gradually thinner from an end portion on the side of the pivot center. Therefore, this makes to easily feel by the touch feeling as to which side of the diametrically extending direction is an indexing direction of the operation member 10.

Further, according to this embodiment, an operating state of the operation member 10 is outputted as an image or voice by a vehicle-mounted monitor 120 or a voice speaker 112 mounted to inside of the vehicle. The vehicle-mounted monitor 120 normally displays map information as a main image and is provided at a position obliquely forwardly of the vehicle seat 1, which can be easily viewed by a seated person of the vehicle seat 1 that is the driver's seat.

Figure 16:
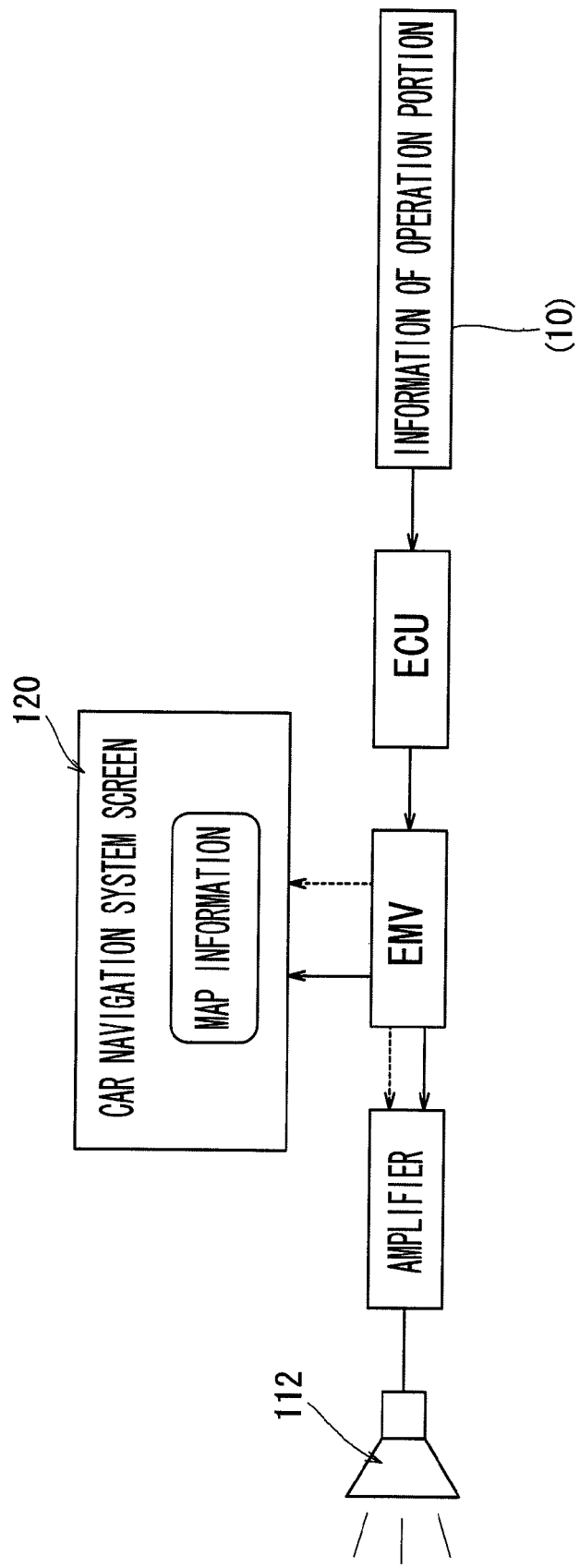
FIG. 16 is a control block diagram of the electric operating device.

The vehicle-mounted monitor 120 and the voice speaker 112 are connected to an EMV (electromultivision) as shown in a control block diagram of FIG. 16. Further, various kinds of operation information are transmitted from the operation member 10 to the EMV by way of an ECU (electronic control unit). Therefore, image information and voice information with regard to the operating states of the electric functions set by the operation member 10 are outputted to the vehicle-mounted monitor 120 and the voice speaker 112 as interrupted image or interrupted voice. Here, the EMV and the ECU correspond to output device of the present invention.

Figure 17:
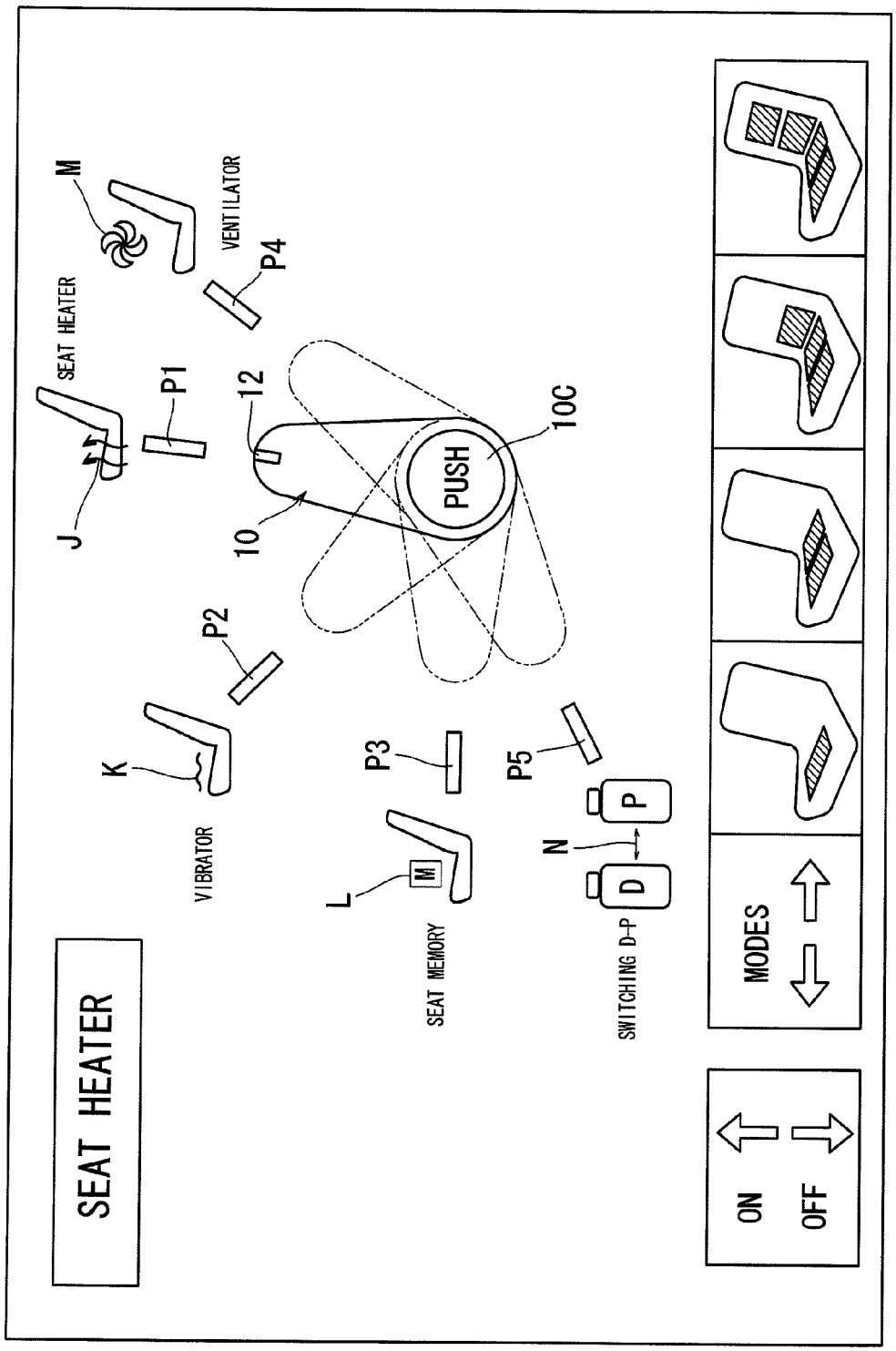
FIG. 17 is a structural view showing an interrupted image displayed on a vehicle-mounted monitor.

Here, FIG. 17 shows how the operating state of the electric function is displayed on the vehicle-mounted monitor 120 as the interrupted image. The drawing shows the operating state when a pushing operation is carried out in the state of setting the operation member 10 to the position P1. Therefore, in this state, the state of selecting the category of the electric function group becomes the state of selecting the electric function related to the comfort improving function. Further, the push operation of the operation member 10 is carried out by the pushing operation of the push button 10C provided at a pivot center portion of the operation member 10.

Further, pictures of four set modes for selecting the activating portion of the seat heater J and indicating that the operation member 10 is set to the position P1 are displayed on the vehicle-mounted monitor 120. Further, at a position on the left side of the four pictures as illustrated, in addition to left and right arrow marks indicating the operating directions of the operation member 10, a character 'mode' is displayed. Further, at a position on the left side of the left and right arrow marks, characters 'ON' and 'OFF' are displayed in addition to arrow marks in upward and downward directions. Therefore, the operator can easily carry out a switching operation of the activating portion of the seat heater J and an operation for switching ON/OFF based on image information displayed on the vehicle-mounted monitor 120.

Further, the pictures of the set modes displayed on the vehicle-mounted monitor 120 are emphasizingly displayed by strongly lighting or winking the selected picture (item) although illustration thereof is omitted. Therefore, the state of selecting the set mode can be easily recognized by visual sensation.

Further, by setting the index portion 12 to the positions P2 through P5 by operating to pivot the operation member 10 about the axis, the vehicle-mounted monitor 120 displays pictures related to the selected electric function or image information of the operating direction or the like. For example, in the state of selecting the vibrator K or the ventilator M, the vehicle-mounted monitor 120 displays characters 'weak', 'middle' and 'strong' indicating strongness or weakness of the output.

Further, in the state of selecting the seat memory L, the vehicle-mounted monitor 120 displays characters '1' '2' '3' indicating registered items. Further, in the state of selecting the D•P switch N, characters 'D: driver's seat', 'P: passenger seat' that are objects of switching are displayed.

Further, the various kinds of operation information of the operation member 10 may be outputted as voice from the voice speaker 112 although illustration thereof is omitted. For example, by outputting voice of 'seat slide operating!!' during the operation for activation of the slide device H shown in Embodiment 1, the state of operating the slide device H can be recognized by auditory sensation by an operator (seated person). Further, it is possible to invite the other passenger's attention that the vehicle seat 1 is moving.

In this way, according to the electric operating device of the vehicle seat of this embodiment, by the vehicle-mounted monitor 120 or the voice speaker 112, the seated person can recognize by the visual sensation or the auditory sensation the state of operating for activation of the electric function set by the operation member 10. Therefore, selection of the electric functions and determination of the activating operation can be further easily carried out.

Further, the state of operating for activation of the electric function set by the operation member 10 is outputted to interrupt when the operation member 10 is operated, and therefore, normally, the vehicle-mounted monitor 120 or the voice speaker 112 can be used by outputting a main image, such as map information, a television image or the like or outputting a main voice, such as music or the like. Further, when the operation member 10 is operated, by outputting the operating state by the interrupted image or the interrupted voice, the operating state can be informed to invite attention.

Although embodiments of the present invention have been explained according to the above two embodiments, the present invention can be carried out in various kinds of configurations other than the above-described embodiments.

For example, with regard to the lumbar support device or the side support device, it may be possible to configure such that, by once operating to slide to move the operation member, the operation member is moved to the position of use that is the support state, or returned to an unused position that is an initial state even if the operation is not continuously made.

Further, in the initial state before the operation for pushing the operation member, the electric function group related to the comfort improving function may be selected. Further, although the pushing operation of the operation member is carried out by the push button in Embodiment 2, it may be possible to configure the entire operation member to be of a push button type. Further, although the construction is disclosed that the categories are switched between the electric function group related to the position adjusting function and the electric function group related to the comfort improving function, a construction in which the categories are mingled may be possible.

What is claimed is:

1. An electric operating device of a vehicle seat having a seat back and a seat cushion, comprising:
    an operation member configured to activate a plurality of electric functions and being provided at the vehicle seat such that a seated person seated on the vehicle seat can operate the operation member,
    the operation member being configured to pivot about an axis and slide in diametrical directions, and
    the operation member being configured to allow a pushing operation in a direction of a center axis of the axis for pivoting the operation member,
    the operation member including:
        an electric function mode switching structure configured to pivot about the axis to switch between a plurality of pivoting positions, wherein when the electric function mode switching structure is pivoted to one of the plurality of pivoting positions, one of the plurality of electric functions is selected for activation;
        an operation control structure configured to slide in diametrical directions to switch between a plurality of slide positions, wherein when the operation control structure is slid to one of the plurality of slide positions, the selected electric function is activated; and
        an electric function category switching structure configured to mutually switch between a first electric function group and a second electric function group other than the first electric function group, the first electric function group including an electric function related to a position adjusting function that is configured to allow a component of the vehicle seat to move,
        the electric function category switching structure being provided with a return mechanism configured to return the operation member to an initial position before an actuation of the pushing operation.

2. The electric operating device of a vehicle seat according to claim 1,
    wherein in an initial state taken before the pushing operation of the operation member, the electric function category switching structure is set to take a state of selecting the first electric function group, and
    wherein in a state of selecting the second electric function group by the pushing operation of the operation member, the operation member is configured to return to a state of selecting the first electric function after a given period of time.

3. The electric operating device of a vehicle seat according to claim 2,
wherein the operation member is disposed at an outer side portion of the vehicle seat, and the operation member is pushed towards an inner side of the vehicle seat to actuate the pushing operation of the operation member.

4. The electric operating device of a vehicle seat according to claim 3,
wherein an electric function related to a comfort improving function for improving comfort of the seated person is included in the second electric function group,
wherein the operation control structure is configured to perform a slide moving operation in forward, rearward, upward and downward directions of the vehicle seat, and
wherein activation of the electric function related to the comfort improving function by the operation member is switched to ON/OFF by an operation of sliding to move the operation member in the upward and downward direction of the vehicle seat, and strength and weakness of an output of the activated electric function related to the comfort improving function is switched by an operation of sliding to move the operation member in the forward and rearward direction of the vehicle seat.

5. The electric operating device of a vehicle seat according to claim 4, further comprising:
a slide direction detector for detecting the diametrical direction of the operation member when the operation member is operated to slide;
a pivoting position detector for detecting a pivoting position of the operation member when the operation member is operated to pivot about the axis;
a pushing operation detector for detecting a movement of the operation member in the direction of the center axis of the axis for pivoting the operation member; and
an outputter that outputs an operational state of the electric function activated by the operation member and is configured to selectively output at least one of an image and an audible representation to a vehicle-mounted monitor and a speaker disposed within a vehicle compartment, respectively, based on a detection of information detected by each of the detectors.

6. The electric operating device of a vehicle seat according to claim 5, wherein when the operation member is operated, the outputter selectively outputs the activated electric function as at least one of an interrupted image and an interrupted audible representation to the vehicle-mounted monitor and the speaker, respectively.

* * * * *